United States Patent [19]
Chen

[11] Patent Number: 6,014,615
[45] Date of Patent: Jan. 11, 2000

[54] SYSTEM AND METHOD FOR PROCESSING MORPHOLOGICAL AND SYNTACTICAL ANALYSES OF INPUTTED CHINESE LANGUAGE PHRASES

[75] Inventor: Chengjun Julian Chen, Yorktown Heights, N.Y.

[73] Assignee: International Business Machines Corporaiton, Armonk, N.Y.

[21] Appl. No.: 08/920,805

[22] Filed: Aug. 29, 1997

Related U.S. Application Data

[62] Division of application No. 08/515,547, Aug. 16, 1994.

[51] Int. Cl.[7] .......................... G06F 17/28; G06F 17/27; B41J 5/08
[52] U.S. Cl. .................. 704/3; 704/7; 704/9; 707/535; 345/171
[58] Field of Search ................................. 704/2, 3, 4, 7, 704/8, 9, 10; 707/535, 536; 400/110; 345/171

[56] References Cited

U.S. PATENT DOCUMENTS

| | | | |
|---|---|---|---|
| 5,212,638 | 5/1993 | Bernath | 707/535 |
| 5,255,189 | 10/1993 | Woo | 707/535 |
| 5,378,068 | 1/1995 | Hua | 400/110 |
| 5,387,042 | 2/1995 | Brown | 400/477 |
| 5,659,769 | 8/1997 | Kida et al. | 707/530 |
| 5,806,021 | 9/1998 | Chen et al. | 704/9 |
| 5,893,133 | 4/1999 | Chen | 707/535 |

*Primary Examiner*—Joseph Thomas
*Attorney, Agent, or Firm*—Louis J. Percello

[57] ABSTRACT

Phonetic Chinese (Pinyin and BPMF) is entered into a computer system and accurately converted into the Hanzi form. The system has a novel keyboard with diacritic keys (and corresponding ASCII coding) that permit the user to annotate each entered phonetic text syllable with a diacritic that indicates the tone of the syllable. A process executing on the system determines that a syllable has been entered when a diacritic (or delimiter) key is struck. An entered phonetic syllable is then compared to a list of acceptable phonetic syllables and abbreviations. If the entered syllable is on the list, the correctly spelled and accented syllable is stored in memory and displayed on a phonetic portion of a graphical display. The process continues for succeeding syllables until a delimiter is entered. Upon encountering a delimiter, the word string (defined as the string of characters between two delimiters) is analyzed using morphological and syntactical processes and/or a statistical language model to unambiguously determine the proper Hanzi characters that represent the word(s) in the word string. The unique Hanzi translation is stored in memory and displayed on a Hanzi portion of the graphical interface.

11 Claims, 21 Drawing Sheets

| HEX NO. | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0 | NUL 0 | SP 16 | SP 32 | 0 48 | @ 64 | P 80 | 96 | p 112 | ā 128 | ū 144 | 160 | 176 | └ 192 | ə 208 | 0' 224 | – 240 | 0000 |
| 1 | 1 | DC1 17 | ! 33 | 1 49 | A 65 | Q 81 | a 97 | q 113 | á 129 | ú 145 | 161 | 177 | ⊥ 193 | Đ 209 | β 225 | ± 241 | 0001 |
| 2 | 301 2 | DC2 18 | " 34 | 2 50 | B 66 | R 82 | b 98 | r 114 | ă 130 | ŭ 146 | 162 | 178 | ┬ 194 | Ê 210 | Ô 226 | = 242 | 0010 |
| 3 | 302 3 | 19 | # 35 | 3 51 | C 67 | S 83 | c 99 | s 115 | à 131 | ù 147 | 163 | 179 | ├ 195 | Ë 211 | Õ 227 | 3/4 243 | 0011 |
| 4 | 303 4 | DC4 20 | $ 36 | 4 52 | D 68 | T 84 | d 100 | t 116 | ē 132 | Ā 148 | 164 | 180 | — 196 | É 212 | o 228 | ¶ 244 | 0100 |
| 5 | 304 5 | 21 | % 37 | 5 53 | E 69 | U 85 | e 101 | u 117 | é 133 | Á 149 | 165 | Ä 181 | + 197 | ï 213 | õ 229 | § 245 | 0101 |
| 6 | 305 6 | 22 | & 38 | 6 54 | F 70 | V 86 | f 102 | v 118 | ĕ 134 | Ă 150 | 166 | Â 182 | a 198 | î 214 | μ 230 | ÷ 246 | 0110 |
| 7 | BEL 7 | 23 | ' 39 | 7 55 | G 71 | W 87 | g 103 | w 119 | è 135 | À 151 | 167 | Ā 183 | Ă 199 | ì 215 | p 231 | , 247 | 0111 |
| 8 | BS 8 | CAN 24 | ( 40 | 8 56 | H 72 | X 88 | h 104 | x 120 | ī 136 | Ē 152 | 168 | © 184 | ╚ 200 | ï 216 | p 232 | ° 248 | 1000 |
| 9 | HT 9 | 25 | ) 41 | 9 57 | I 73 | Y 89 | i 105 | y 121 | í 137 | É 153 | ® 169 | ╣ 185 | ╔ 201 | ┘ 217 | U 233 | .. 249 | 1001 |
| A | LF 10 | 26 | · 42 | : 58 | J 74 | Z 90 | j 106 | z 122 | ĭ 138 | Ĕ 154 | ─ 170 | ║ 186 | ╩ 202 | ┐ 218 | U 234 | . 250 | 1010 |
| B | VT 11 | ESC 27 | + 43 | ; 59 | K 75 | [ 91 | k 107 | { 123 | ì 139 | È 155 | 1/2 171 | ╗ 187 | ╦ 203 | □ 219 | Ū 235 | 1 251 | 1011 |
| C | FF 12 | FS 28 | , 44 | < 60 | L 76 | \ 92 | l 108 | | 124 | ō 140 | Ō 156 | 1/4 172 | ╝ 188 | ╠ 204 | = 220 | y 236 | 3 252 | 1100 |
| D | CR 13 | 29 | - 45 | = 61 | M 77 | ] 93 | m 109 | } 125 | ó 141 | Ó 157 | i 173 | ¢ 189 | = 205 | | 221 | Ý 237 | 2 253 | 1101 |
| E | SO 14 | 30 | . 46 | > 62 | N 78 | ^ 94 | n 110 | ~ 126 | ŏ 142 | Ŏ 158 | << 174 | ╪ 190 | ╬ 206 | ï 222 | – 238 | □ 254 | 1110 |
| F | SI 15 | 31 | / 47 | ? 63 | O 79 | _ 95 | o 111 | ü 127 | ò 143 | Ò 159 | >> 175 | ┐ 191 | ○ 207 | = 223 | - 239 | SP 255 | 1111 |
| | 0000 | 0001 | 0010 | 0011 | 0100 | 0101 | 0110 | 0111 | 1000 | 1001 | 1010 | 1011 | 1100 | 1101 | 1110 | 1111 | BINARY NO. |

| A | | | | | |
|---|---|---|---|---|---|
| ā | 1 | bāng | 33 | | |
| á | 2 | báng | 34 | | |
| ǎ | 3 | bǎng | 35 | | |
| à | 4 | bāo | 36 | | |
| ·a | 5 | báo | 37 | | |
| āi | 6 | bǎo | 38 | | |
| ái | 7 | bào | 39 | | |
| ǎi | 8 | bēi | 40 | | |
| ài | 9 | béi | 41 | | |
| ān | 10 | běi | 42 | | |
| án | 11 | ·bei | 43 | | |
| àn | 12 | bēn | 44 | | |
| āng | 13 | bén | 45 | | |
| áng | 14 | bèn | 46 | | |
| àng | 15 | bēng | 47 | | |
| āo | 16 | béng | 48 | | |
| | | běng | 49 | | |
| | | bèng | 50 | | |

| | | | | | |
|---|---|---|---|---|---|
| bǐng | 69 | chǎ | 103 | chǒng | 139 | cōu | 175 |
| bō | 70 | chà | 104 | chòng | 140 | cū | 176 |
| bó | 71 | chāi | 105 | chōu | 141 | cú | 177 |
| bǒ | 72 | chái | 106 | chóu | 142 | cǔ | 178 |
| bò | 73 | chǎi | 107 | chǒu | 143 | cù | 179 |
| ·bo | 74 | chài | 108 | chòu | 144 | cuān | 180 |
| bū | 75 | chān | 109 | chū | 145 | cuán | 181 |
| bú | 76 | chán | 110 | chú | 146 | cuǎn | 182 |
| bǔ | 77 | chǎn | 111 | chǔ | 147 | cuī | 183 |
| bù | 78 | chàn | 112 | chù | 148 | cuí | 184 |
| | | chāng | 113 | chuā | 149 | cuǐ | 185 |
| C | | cháng | 114 | chuāi | 150 | cùn | 186 |
| cā | 79 | chǎng | 115 | chuái | 151 | cún | 187 |
| cá | 80 | chàng | 116 | chuǎi | 152 | cǔn | 188 |
| cāi | 81 | chāo | 117 | chuài | 153 | cùn | 189 |
| cái | 82 | cháo | 118 | chuān | 154 | cuō | 190 |
| cǎi | 83 | chǎo | 119 | chuán | 155 | cuó | 191 |
| cài | 84 | chào | 120 | chuǎn | 156 | cuò | 192 |

FIG. 7B

| | | | | | | | |
|---|---|---|---|---|---|---|---|
| ǎo | 17 | bǐ | 51 | cān | 85 | chē | 121 | chuǎn | 157 | dā | 193 |
| ǎo | 18 | bì | 52 | cǎn | 86 | chě | 122 | chuāng | 158 | dá | 194 |
| ǎo | 19 | bì | 53 | càn | 87 | chè | 123 | chuǎng | 159 | dǎ | 195 |
| B | | bì | 54 | càn | 88 | chēn | 124 | chuāng | 160 | dà | 196 |
| bā | 20 | biān | 55 | cāng | 89 | chén | 125 | chuǎng | 161 | ·da | 197 |
| bá | 21 | biǎn | 56 | cáng | 90 | chěn | 126 | chuī | 162 | dāi | 198 |
| bǎ | 22 | biàn | 57 | cāo | 91 | ·chen | 127 | chuí | 163 | dǎi | 199 |
| bà | 23 | biāo | 58 | cáo | 92 | chēng | 128 | chūn | 164 | dài | 200 |
| ·ba | 24 | biǎo | 59 | cǎo | 93 | chéng | 129 | chún | 165 | dān | 201 |
| bāi | 25 | biào | 60 | cè | 94 | chěng | 130 | chǔn | 166 | dǎn | 202 |
| bái | 26 | biē | 61 | cěi | 95 | chèng | 131 | chuō | 167 | dàn | 203 |
| bǎi | 27 | bié | 62 | cēn | 96 | chī | 132 | chuò | 168 | dāng | 204 |
| bài | 28 | biě | 63 | cén | 97 | chí | 133 | cī | 169 | dǎng | 205 |
| ·bai | 29 | biè | 64 | cēng | 98 | chǐ | 134 | cí | 170 | dàng | 206 |
| bān | 30 | bīn | 65 | céng | 99 | chì | 135 | cǐ | 171 | dāo | 207 |
| bǎn | 31 | bìn | 66 | cèng | 100 | chōng | 136 | cì | 172 | dǎo | 208 |
| bàn | 32 | bīng | 67 | chā | 101 | chōng | 137 | cōng | 173 | |
| | | bǐng | 68 | chá | 102 | chóng | 138 | cóng | 174 | |

| | | | | | | | |
|---|---|---|---|---|---|---|---|
| dǎo | 209 | dūn | 252 | fēn | 291 | gěng | 332 | hān | 373 | huǎn | 416 |
| dào | 210 | dǔn | 253 | fén | 292 | gèng | 333 | hán | 374 | huàn | 417 |
| dē | 211 | dùn | 254 | fěn | 293 | gōng | 334 | hǎn | 375 | huāng | 418 |
| dé | 212 | duō | 255 | fèn | 294 | gǒng | 335 | hàn | 376 | huáng | 419 |
| ·de | 213 | duó | 256 | fēng | 295 | gòng | 336 | hāng | 377 | huǎng | 420 |
| dēi | 214 | duǒ | 257 | féng | 296 | gōu | 337 | háng | 378 | huàng | 421 |
| děi | 215 | duò | 258 | fěng | 297 | gǒu | 338 | hàng | 379 | huī | 422 |
| dèn | 216 | E | | fiào | 298 | gòu | 339 | hāo | 380 | huí | 423 |
| dēng | 217 | ē | 259 | fó | 299 | gū | 340 | háo | 381 | huǐ | 424 |
| děng | 218 | é | 260 | fǒu | 300 | gú | 341 | hǎo | 382 | huì | 425 |
| dèng | 219 | ě | 261 | fū | 301 | gǔ | 342 | hào | 383 | hūn | 426 |
| dī | 220 | è | 262 | fú | 302 | gù | 343 | hē | 384 | hún | 427 |
| dí | 221 | ·e | 263 | fǔ | 303 | guā | 344 | hé | 385 | hǔn | 428 |
| dǐ | 222 | ēi | 264 | fù | 304 | guá | 345 | hè | 386 | hùn | 429 |
| dì | 223 | éi | 265 | | 305 | guǎ | 346 | hēi | 387 | huō | 430 |
| diǎ | 224 | ěi | 266 | G | | guǎi | 347 | hén | 388 | huó | 431 |
| diān | 225 | èi | 267 | gā | 306 | guài | 348 | hěn | 389 | huǒ | 432 |
| diǎn | 226 | ēn | 268 | gá | 307 | guān | 349 | hèn | 390 | J | |
| diàn | 227 | èn | 269 | gǎ | 308 | guǎn | 350 | hēng | 391 | jī | 433 |
| diāo | 228 | ēng | 270 | gà | 309 | guàn | 351 | héng | 392 | jí | 434 |
| diáo | 229 | ér | 271 | gāi | 310 | guāng | 352 | hèng | 393 | jǐ | 435 |
| diǎo | 230 | | | | | | 353 | hm | 394 | | |

FIG. 7D

| | | | | | | | |
|---|---|---|---|---|---|---|---|
| diē | 231 | ěr | 272 | gāi | 311 | guǎng | 354 | hng | 395 | jī | 436 |
| dié | 232 | ér | 273 | gǎi | 312 | guǎng | 355 | hóng | 396 | jiā | 437 |
| dīng | 233 | F | | gān | 313 | guī | 356 | hōng | 397 | jiá | 438 |
| dǐng | 234 | fā | 274 | gǎn | 314 | guǐ | 357 | hóng | 398 | jiǎ | 439 |
| dìng | 235 | fá | 275 | gàn | 315 | guì | 358 | hòng | 399 | jià | 440 |
| diū | 236 | fǎ | 276 | gāng | 316 | gǔn | 359 | hōu | 400 | jiān | 441 |
| dōng | 237 | fà | 277 | gǎng | 317 | gùn | 360 | hóu | 401 | jiǎn | 442 |
| dǒng | 238 | •fa | 278 | gàng | 318 | guō | 361 | hòu | 402 | jiàn | 443 |
| dòng | 239 | fān | 279 | gāo | 319 | guó | 362 | hū | 403 | jiāng | 444 |
| dōu | 240 | fán | 280 | gǎo | 320 | guǒ | 363 | hú | 404 | jiǎng | 445 |
| dǒu | 241 | fǎn | 281 | gào | 321 | guò | 364 | hǔ | 405 | jiàng | 446 |
| dòu | 242 | fàn | 282 | gē | 322 | H | | huā | 406 | jiāo | 447 |
| dú | 243 | fāng | 283 | gé | 323 | hā | 365 | huá | 407 | jiǎo | 448 |
| dǔ | 244 | fáng | 284 | gě | 324 | há | 366 | huà | 408 | jiào | 449 |
| dù | 245 | fǎng | 285 | gè | 325 | hǎ | 367 | huái | 409 | jiào | 450 |
| dù | 246 | fàng | 286 | gěi | 326 | hà | 368 | huài | 410 | jiē | 451 |
| duān | 247 | fēi | 287 | gēn | 327 | hāi | 369 | •huai | 411 | jié | 452 |
| duǎn | 248 | féi | 288 | gén | 328 | hái | 370 | huān | 412 | jiě | 453 |
| duàn | 249 | fěi | 289 | gěn | 329 | hǎi | 371 | huán | 413 | jiè | 454 |
| duī | 250 | fèi | 290 | gèn | 330 | hài | 372 | | 414 | •jie | 455 |
| duì | 251 | | | gēng | 331 | | | | 415 | jīn | 456 |

FIG. 7E

| | | | | | | | | |
|---|---|---|---|---|---|---|---|---|
| jǐn | 457 | kē | 498 | lǎn | 539 | lín | 582 | M | |
| jìn | 458 | kēi | 499 | làn | 540 | lǐn | 583 | | |
| jīng | 459 | kěn | 500 | lāng | 541 | lìn | 584 | | |
| jǐng | 460 | kèn | 501 | láng | 542 | líng | 585 | | |
| jìng | 461 | kēng | 502 | lǎng | 543 | lǐng | 586 | | |
| jiōng | 462 | kōng | 503 | làng | 544 | lìng | 587 | | |
| jiǒng | 463 | kǒng | 504 | lāo | 545 | liū | 588 | | |
| jiū | 464 | kòng | 505 | láo | 546 | liú | 589 | | |
| jiǔ | 465 | kōu | 506 | lǎo | 547 | liǔ | 590 | | |
| jiù | 466 | kǒu | 507 | lào | 548 | liù | 591 | | |
| ·jiu | 467 | kòu | 508 | lē | 549 | ·lo | 592 | ḿ | 623 |
| jū | 468 | kū | 509 | lè | 550 | lōng | 593 | m̀ | 624 |
| jú | 469 | kǔ | 510 | ·le | 551 | lóng | 594 | mā | 625 |
| jǔ | 470 | kù | 511 | lēi | 552 | lǒng | 595 | má | 626 |
| jù | 471 | kuā | 512 | léi | 553 | lòng | 596 | mǎ | 627 |
| juān | 472 | kuǎ | 513 | lěi | 554 | lōu | 597 | mà | 628 |
| juǎn | 473 | kuà | 514 | lèi | 555 | lóu | 598 | ·ma | 629 |
| juàn | 474 | kuāi | 515 | ·lei | 556 | lǒu | 599 | māi | 630 |
| juē | 475 | kuài | 516 | lēng | 557 | lòu | 600 | mái | 631 |
| jué | 476 | kuān | 517 | léng | 558 | ·lou | 601 | mǎi | 632 |
| juě | 477 | kuǎn | 518 | lěng | 559 | lū | 602 | mān | 633 |
| juè | 478 | kuāng | 519 | lèng | 560 | lú | 603 | mán | 634 |
| | | | | | | | | mǎn | 635 |
| | | | | | | | | màn | 636 |
| | | | | | | | | māng | 637 |
| | | | | | | | | máng | 638 |
| | | | | | | | | mǎng | 639 |
| | | | | | | | | māo | 640 |
| | | | | | | | | máo | 641 |
| | | | | | | | | mǎo | 642 |

| | |
|---|---|
| miāo | 674 |
| miǎo | 675 |
| miào | 676 |
| miē | 677 |
| miè | 678 |
| mīn | 679 |
| mín | 680 |
| mǐng | 681 |
| mìng | 682 |
| míng | 683 |
| miù | 684 |
| mō | 685 |
| mó | 686 |
| mǒ | 687 |
| mò | 688 |
| mōu | 689 |
| móu | 690 |
| mǒu | 691 |
| mū | 692 |
| mú | 693 |
| mǔ | 694 |

FIG. 7F

| | | | | | | | | N | |
|---|---|---|---|---|---|---|---|---|---|
| jūn | 479 | | | lī | 561 | lǚ | 604 | | |
| jùn | 480 | | | lí | 562 | lǘ | 605 | mào | 643 |
| K | | | | lǐ | 563 | ·lu | 606 | ·me | 644 |
| kā | 481 | kuāng | 520 | lì | 564 | lǜ | 607 | měi | 645 |
| kǎ | 482 | kuáng | 521 | ·li | 565 | lǜ | 608 | měi | 646 |
| kāi | 483 | kuàng | 522 | liǎ | 566 | luán | 609 | mèi | 647 |
| kǎi | 484 | kuī | 523 | lián | 567 | luǎn | 610 | mēn | 648 |
| kài | 485 | kuí | 524 | lián | 568 | luàn | 611 | mén | 649 | ǹ | 695 |
| kān | 486 | kuǐ | 525 | liǎn | 569 | lüè | 612 | mèn | 650 | ň | 696 |
| kǎn | 487 | kuì | 526 | liáng | 570 | lüè | 613 | ·men | 651 | ǹ | 697 |
| kàn | 488 | kūn | 527 | liǎng | 571 | lūn | 614 | mēng | 652 | nā | 698 |
| kāng | 489 | kǔn | 528 | liàng | 572 | lún | 615 | méng | 653 | ná | 699 |
| káng | 490 | kùn | 529 | liāo | 573 | lǔn | 616 | měng | 654 | nǎ | 700 |
| kàng | 491 | kuò | 530 | liáo | 574 | lùn | 617 | mèng | 655 | nà | 701 |
| kāo | 492 | L | | liǎo | 575 | luō | 618 | mī | 656 | ·na | 702 |
| káo | 493 | lā | 531 | liào | 576 | luó | 619 | mí | 657 | nāi | 703 |
| kào | 494 | lá | 532 | liē | 577 | luǒ | 620 | mǐ | 658 | nái | 704 |
| kē | 495 | lǎ | 533 | lié | 578 | luò | 621 | mì | 659 | nǎn | 705 |
| ké | 496 | là | 534 | liě | 579 | luò | 622 | mián | 670 | nán | 706 |
| kě | 497 | ·la | 535 | ·lie | 580 | | | mián | 671 | nǎn | 707 |
| | | lāi | 536 | līn | 581 | | | miǎn | 672 | nàn | 708 |
| | | lái | 537 | | | | | miǎo | 673 | nāng | 709 |
| | | lǎn | 538 | | | | | | | náng | 710 |
| | | | | | | | | | | nǎng | 711 |
| | | | | | | | | | | nàng | 712 |
| | | | | | | | | | | nāo | 713 |
| | | | | | | | | | | náo | 714 |

FIG. 76

| | | | | | | |
|---|---|---|---|---|---|---|
| nǎo | 715 | pēng | 797 | qiǎ | 838 | |
| nào | 716 | pī | 798 | qiān | 839 | |
| nè | 717 | pí | 799 | qiān | 840 | |
| nè | 718 | pǐ | 800 | qiǎn | 841 | |
| ·ne | 719 | pì | 801 | qiàn | 842 | |
| něi | 720 | piān | 802 | qiāng | 843 | |
| nèi | 721 | pián | 803 | qiáng | 844 | |
| nèn | 722 | piǎn | 804 | qiǎng | 845 | |
| néng | 723 | piàn | 805 | qiàng | 846 | |
| ńg | 724 | piāo | 806 | qiāo | 845A | |
| ńg | 725 | piáo | 807 | qiáo | 846A | |
| ňg | 726 | piǎo | 808 | qiǎo | 847 | |
| nī | 727 | piào | 809 | qiào | 848 | |
| ní | 728 | piē | 810 | qiē | 849 | |
| nǐ | 729 | piě | 811 | qié | 850 | |
| nì | 730 | piè | 812 | qiě | 851 | |
| niān | 731 | pīn | 813 | qiè | 852 | |
| nián | 732 | pín | 814 | qīn | 853 | |
| niǎn | 733 | pǐn | 815 | qín | 854 | |
| niàn | 734 | pìn | 816 | qǐn | 855 | |
| niāng | 735 | pīng | 817 | qìn | 856 | |
| niáng | 736 | píng | 818 | qīng | 857 | |

| | | | | | | |
|---|---|---|---|---|---|---|
| nuǎn | 758 | | | R | | |
| nüè | 759 | | | rǎn | 879 | sān 918 |
| nǜn | 760 | | | ràn | 880 | sǎn 919 |
| nuó | 761 | | | rāng | 881 | sàn 920 |
| nuò | 762 | | | ráng | 882 | sāng 921 |
| O | | | | rǎng | 883 | sǎng 922 |
| ō | 763 | | | ràng | 884 | sàng 923 |
| ó | 764 | | | rāo | 885 | sāo 924 |
| ǒ | 765 | | | ráo | 886 | sǎo 925 |
| ò | 766 | | | rǎo | 887 | sào 926 |
| ōu | 767 | | | rào | 888 | sè 927 |
| ǒu | 768 | | | rě | 889 | sēn 928 |
| òu | 769 | | | rè | 890 | sēng 929 |
| P | | | | rén | 891 | shā 930 |
| pā | 770 | | | rěn | 892 | shá 931 |
| pá | 771 | | | rèn | 893 | shǎ 932 |
| pà | 772 | | | rēng | 894 | shāi 933 |
| pāi | 773 | | | réng | 895 | shǎi 934 |
| pái | 774 | | | rì | 896 | shài 935 |
| pǎi | 775 | | | róng | 897 | shān 936 |
| | | | | ròu | 898 | shǎn 937 |
| | | | | | | shàn 938 |
| | | | | | | shāng 939 |

FIG. 7H

| | | | | | | |
|---|---|---|---|---|---|---|
| niǎo | 737 | pāi | 776 | pō | 819 | qīng | 858 | róu | 899 | shǎng | 940 |
| niào | 738 | pān | 777 | pó | 820 | qíng | 859 | rú | 900 | shàng | 941 |
| niē | 739 | pán | 778 | pǒ | 821 | qǐng | 860 | rǔ | 901 | ·shang | 942 |
| niè | 740 | pàn | 779 | pò | 822 | qióng | 861 | rù | 902 | shāo | 943 |
| niè | 741 | pāng | 780 | ·po | 823 | qiū | 862 | ruá | 903 | sháo | 944 |
| nín | 742 | páng | 781 | pōu | 824 | qiú | 863 | ruǎn | 904 | shǎo | 945 |
| níng | 743 | pǎng | 782 | póu | 825 | qiǔ | 864 | ruǎn | 905 | shào | 946 |
| nǐng | 744 | pàng | 783 | pǒu | 826 | qū | 865 | ruí | 906 | shē | 947 |
| nìng | 745 | pāo | 784 | pū | 827 | qú | 866 | ruǐ | 907 | shé | 948 |
| niū | 746 | páo | 785 | pú | 828 | qǔ | 867 | ruì | 908 | shě | 949 |
| niú | 747 | pǎo | 786 | pǔ | 829 | qù | 868 | rún | 909 | shè | 950 |
| niǔ | 748 | pào | 787 | pù | 830 | ·qu | 869 | rùn | 910 | shéi | 951 |
| niù | 749 | pēi | 788 | | | quān | 870 | ruō | 911 | shēn | 952 |
| nóng | 750 | péi | 789 | Q | | quán | 871 | ruò | 912 | shén | 953 |
| nòng | 751 | pèi | 790 | qī | 831 | quǎn | 872 | | | shěn | 954 |
| nòu | 752 | pēn | 791 | qí | 832 | quàn | 873 | S | | shèn | 955 |
| nú | 753 | pén | 792 | qǐ | 833 | quē | 874 | sā | 913 | shēng | 956 |
| nǔ | 754 | pèn | 793 | qì | 834 | qué | 875 | sǎ | 914 | shéng | 957 |
| nù | 755 | pēng | 794 | qiā | 835 | què | 876 | sà | 915 | shěng | 958 |
| nǚ | 756 | péng | 795 | qiá | 836 | qūn | 877 | sāi | 916 | shèng | 959 |
| nǜ | 757 | péng | 796 | qiǎ | 837 | qún | 878 | sài | 917 | shī | 960 |

FIG. 7I

| | | | | | | | | |
|---|---|---|---|---|---|---|---|---|
| shī | 961 | suān | 1004 | tiān | 1045 | wā | 1086 | xiān | 1127 | xūn | 1170 |
| shí | 962 | suàn | 1005 | tiáo | 1046 | wá | 1087 | xián | 1128 | xùn | 1171 |
| shǐ | 963 | suī | 1006 | tiǎo | 1047 | wǎ | 1088 | xiǎn | 1129 | | |
| ·shi | 964 | suí | 1007 | tiào | 1048 | ·wa | 1089 | xiāng | 1130 | Y | |
| shōu | 965 | suǐ | 1008 | tiáo | 1049 | wāi | 1090 | xiáng | 1131 | yā | 1172 |
| shóu | 966 | suì | 1009 | tiē | 1050 | wǎi | 1091 | xiǎng | 1132 | yá | 1173 |
| shǒu | 967 | sūn | 1010 | tié | 1051 | wài | 1092 | xiàng | 1133 | yǎ | 1174 |
| shòu | 968 | sǔn | 1011 | tiě | 1052 | wān | 1093 | xiāo | 1134 | yà | 1175 |
| shū | 969 | suō | 1012 | tīng | 1053 | wán | 1094 | xiáo | 1135 | ·ya | 1176 |
| shú | 970 | suǒ | 1013 | tíng | 1054 | wǎn | 1095 | xiǎo | 1136 | yān | 1177 |
| shǔ | 971 | | | tǐng | 1055 | wàn | 1096 | xiào | 1137 | yán | 1178 |
| shù | 972 | T | | tìng | 1056 | wāng | 1097 | xiē | 1138 | yǎn | 1179 |
| shuā | 973 | tā | 1014 | tōng | 1057 | wáng | 1098 | xié | 1139 | yàn | 1180 |
| shuá | 974 | tá | 1015 | tóng | 1058 | wǎng | 1099 | xiě | 1140 | yāng | 1181 |
| shuǎ | 975 | tà | 1016 | tǒng | 1059 | wàng | 1100 | xiè | 1141 | yáng | 1182 |
| shuāi | 976 | tāi | 1017 | tòng | 1060 | wēi | 1101 | xīn | 1142 | yǎng | 1183 |
| shuǎi | 977 | tái | 1018 | tōu | 1061 | wéi | 1102 | xín | 1143 | yàng | 1184 |
| shuài | 978 | tǎi | 1019 | tóu | 1062 | wěi | 1103 | xǐn | 1144 | yāo | 1185 |
| shuān | 979 | tài | 1020 | tǒu | 1063 | wèi | 1104 | xìn | 1145 | yáo | 1186 |
| shuǎn | 980 | tān | 1021 | tòu | 1064 | wēn | 1105 | xīng | 1146 | yǎo | 1187 |
| shuāng | 981 | tán | 1022 | tū | 1065 | wén | 1106 | xíng | 1147 | yào | 1188 |
| shuǎng | 982 | tǎn | 1023 | tú | 1066 | wěn | 1107 | xǐng | 1148 | yē | 1189 |

FIG. 7J

| | | | | | | | | |
|---|---|---|---|---|---|---|---|---|
| shuí | 983 | tān | 1024 | tǔ | 1067 | wēn | 1108 | xíng | 1149 | yē | 1190 |
| shuǐ | 984 | tāng | 1025 | tù | 1068 | wēng | 1109 | xiōng | 1150 | yě | 1191 |
| shuì | 985 | táng | 1026 | tuān | 1069 | wěng | 1110 | xiōng | 1151 | yè | 1192 |
| shūn | 986 | tǎng | 1027 | tuán | 1070 | wèng | 1111 | xiòng | 1152 | yī | 1193 |
| shǔn | 987 | tàng | 1028 | tuǎn | 1071 | wǒ | 1112 | xiū | 1153 | yí | 1194 |
| shuō | 988 | tāo | 1029 | tuī | 1072 | wǒ | 1113 | xiǔ | 1154 | yǐ | 1195 |
| shuò | 989 | táo | 1030 | tuí | 1073 | wò | 1114 | xiù | 1155 | yì | 1196 |
| sī | 990 | tǎo | 1031 | tuǐ | 1074 | wū | 1115 | xū | 1156 | yì | 1197 |
| sǐ | 991 | tào | 1032 | tuì | 1075 | wú | 1116 | xú | 1157 | yīn | 1198 |
| sì | 992 | tè | 1033 | tūn | 1076 | wǔ | 1117 | xǔ | 1158 | yín | 1199 |
| ·si | 993 | ·te | 1034 | tún | 1077 | wù | 1118 | xù | 1159 | yǐn | 1200 |
| sōng | 994 | tēi | 1035 | tǔn | 1078 | X | | ·xu | 1160 | yìn | 1201 |
| sóng | 995 | tēng | 1036 | tùn | 1079 | xī | 1119 | xuān | 1161 | yīng | 1202 |
| sǒng | 996 | téng | 1037 | tuō | 1080 | xí | 1120 | xuán | 1162 | yíng | 1203 |
| sòng | 997 | tī | 1038 | tuó | 1081 | xǐ | 1121 | xuǎn | 1163 | yǐng | 1204 |
| sōu | 998 | tí | 1039 | tuǒ | 1082 | xì | 1122 | xuàn | 1164 | yìng | 1205 |
| sǒu | 999 | tǐ | 1040 | tuò | 1083 | xiā | 1123 | xuē | 1165 | yō | 1206 |
| sòu | 1000 | tì | 1041 | | 1084 | xiá | 1124 | xué | 1166 | ·yo | 1207 |
| sū | 1001 | tiān | 1042 | W | | xià | 1125 | xuě | 1167 | yōng | 1208 |
| sú | 1002 | tián | 1043 | wā | 1085 | xiān | 1126 | xuè | 1168 | yóng | 1209 |
| sù | 1003 | tiǎn | 1044 | | | | | xūn | 1169 | yǒng | 1210 |

FIG. 7K

| | | | | | | | | |
|---|---|---|---|---|---|---|---|---|
| yōu | 1211 | zǎ | 1232 | zhā | 1255 | zhēi | 1278 | zhuǎ | 1301 | zǒu | 1324 |
| yóu | 1212 | zāi | 1233 | zhá | 1256 | zhēn | 1279 | zhuāi | 1302 | zòu | 1325 |
| yǒu | 1213 | zǎi | 1234 | zhǎ | 1257 | zhěn | 1280 | zhuǎi | 1303 | zū | 1326 |
| yòu | 1214 | zài | 1235 | zhà | 1258 | zhèn | 1281 | zhuài | 1304 | zú | 1327 |
| yū | 1215 | zān | 1236 | zhāi | 1259 | zhēng | 1282 | zhuān | 1305 | zǔ | 1328 |
| yú | 1216 | zán | 1237 | zhái | 1260 | zhěng | 1283 | zhuǎn | 1306 | zuān | 1329 |
| yǔ | 1217 | zǎn | 1238 | zhǎi | 1261 | zhèng | 1284 | zhuàn | 1307 | zuǎn | 1330 |
| yù | 1218 | zàn | 1239 | zhài | 1262 | zhī | 1285 | zhuāng | 1308 | zuàn | 1331 |
| yuān | 1219 | ·zan | 1240 | zhān | 1263 | zhí | 1286 | zhuǎng | 1309 | zuī | 1332 |
| yuán | 1220 | zāng | 1241 | zhǎn | 1264 | zhǐ | 1287 | zhuàng | 1310 | zuǐ | 1333 |
| yuǎn | 1221 | zàng | 1242 | zhàn | 1265 | zhì | 1288 | zhuī | 1311 | zuì | 1334 |
| yuàn | 1222 | zàng | 1243 | zhāng | 1266 | zhōng | 1289 | zhuǐ | 1312 | zūn | 1335 |
| yuē | 1223 | zāo | 1244 | zhǎng | 1267 | zhǒng | 1290 | zhūn | 1313 | zǔn | 1336 |
| yuě | 1224 | záo | 1245 | zhàng | 1268 | zhòng | 1291 | zhǔn | 1314 | zùn | 1337 |
| yuè | 1225 | zǎo | 1246 | zhāo | 1269 | zhōu | 1292 | zhuō | 1315 | zuō | 1338 |
| yūn | 1226 | zào | 1247 | zháo | 1270 | zhóu | 1293 | zhuó | 1316 | zuó | 1339 |
| yún | 1227 | zé | 1248 | zhǎo | 1271 | zhǒu | 1294 | zī | 1317 | zuǒ | 1340 |
| yǔn | 1228 | zè | 1249 | zhào | 1272 | zhòu | 1295 | zǐ | 1318 | zuò | 1341 |
| yùn | 1229 | zéi | 1250 | zhē | 1273 | zhū | 1296 | zì | 1319 | | |
| Z | | zēn | 1251 | zhé | 1274 | zhú | 1297 | zōng | 1320 | | |
| zā | 1230 | zèn | 1252 | zhě | 1275 | zhǔ | 1298 | zǒng | 1321 | | |
| zá | 1231 | zēng | 1253 | zhè | 1276 | zhù | 1299 | zòng | 1322 | | |
| | | zèng | 1254 | ·zhe | 1277 | zhuā | 1300 | zōu | 1323 | | |

FIG. 8

FUNCTION WORD, PARTICLE, AND AFFIX LIST

810. PREPOSITIONS:

an, ba, bei, bi, chao, chu, cong, dang, dao, dui, gei, gen, jiang, jiu, ju, lian, ping, rang, shi, shunzhe, ti, tong, wang, wei, weile

820. TENSE PARTICLES:

le, zhe, guo

830. RELATION PARTICLES:

de, zhi

840. CONJUNCTIONS:

he, ji, gen

850. CONJUNCTIONS:

bing, bingqie, budan, buguo, bulun, chufei, er, erqie, he, huo, huozhe, ji, jiran, jishi, jiaru, keshi, raner, ruguo, suiran, yiji, yinci, yiner, yinwei, yu, yuqi, yushi, zhiyao, zhiyou

860. NOUN SUFFIXES:

-z, -r, -tou, -men, -fa, -jia, -pin, -qi, -sheng, -shi, -shou, -yuan, -zhang, -zhe, -zhuyi

870. ADJECTIVE AND ADVERBS SUFFIXES:

-side, -ran, -xixide, -yangde

880. ADJECTIVE AND ADVERB PREFIXES:

hen-, zui-, bu-, geng.

890. INTERJECTIONS:

a, ai, aiya, ei, hai, hm, m, o, pei, wei, ya, yi, yo

SYSTEM AND METHOD FOR PROCESSING MORPHOLOGICAL AND SYNTACTICAL ANALYSES OF INPUTTED CHINESE LANGUAGE PHRASES

This is a divisional application of U.S. patent application Ser. No. 08/515,547 to Chen, filed on Aug. 16, 1994.

FIELD OF THE INVENTION

This invention relates to an improved system and method of using a computer to process Chinese language text, specifically phonetic Chinese text and Hanzi.

BACKGROUND OF THE INVENTION

Entering (inputting) and processing Chinese language text on a computer is a very difficult problem. The shear numbers of Chinese characters illustrate this difficulty. In the square-character (Hanzi) writing system of Chinese, there are 3000 to 6000 commonly used Chinese characters (Hanzi). Including the relatively rare ones, there are more than ten thousand Hanzi. Adding to this difficulty there are problems in the Chinese language with text standardization, multiple homonyms, and ill defined word boundaries that impede effective text processing of Hanzi with computers. In spite of intensive studies for several decades and the existence of hundreds of different methods, computer input and processing of Hanzi is a major stumbling block preventing the use computers in China, particularly for text processing.

The computer systems available today for inputting and processing Chinese language text may be divided into three categories:

The first category is based on a decomposition of the square characters into elementary graphical components. Different keys on the keyboard are assigned to represent different elementary graphical components of a Hanzi. Then, each character can be keyed in with a few key strokes—as a combination or these elementary graphical components. Examples or this approach include Changji in Taiwan and the Five-Stroke method in mainland China. The major drawback of such methods is that the assignment of the keys to Hanzi components is artificial. In both the Changji and Five-Stroke methods, the assignment or the codes has to be mechanically memorized. Memorizing the keys representing the components is difficult and time consuming. Besides, the decomposition of a Hanzi into its elementary components in many cases is not unique. Although these methods are used by professional input operators, and high speed is demonstrated by well-trained typists, they are not used much by computer experts and other professionals, let alone ordinary people. Therefore, these methods tend to restrict the use of computers by the general Chinese speaking population.

The second and third category encounter a "homonym problem" in Chinese language processing.

The second category is phonetic input, (e.g. Pinyin for mainland China and "phonetic symbols" or BPMF for Taiwan) which is the most commonly used method for everyone except professional typists. The Hanzi writing system of Chinese language is a conceptual and practical barrier to this method.

Since there are only about 1300 different phonetic syllables, in contrast to tens of thousands of characters, one phonetic syllable may correspond to many different Hanzi. For example, the pronunciation of "yi" in Mandarin can correspond to over 100 Hanzi. This creates ambiguities when translating the phonetic syllables into Hanzi.

To address this "homonym problem," most of the phonetic input systems use a multiple-choice method. See for example, German patent 3,142,138, issued May. 5, 1983, by J. Heinzl et al.; U.S. Pat. No. 5,047,932, issued Sep. 10, 1991, by K. C. Hsieh; and Chinese patent 1,064,957 issued Mar. 8, 1991, by Tan Shanguang. After a phonetic syllable is keyed in, the computer displays all possible Hanzi with the same pronunciation. In some cases, there is not enough space on the screen to display all possible characters with the same pronunciation. These cases require scrolling up and down. Therefore, these phonetic methods, based on individual syllables, are very slow.

An improvement to the multiple-choice methods based on deriving probability of the adjacent Hanzi is disclosed in the prior art. See for example, British patent 2,248,328, issued on Apr. 1, 1992 to R. W. Sproat. The probability approach can further be combined with grammatical constraints. See for example, K. T. Lua et al., Computer Processing of Chinese and Oriental Languages, Vol. 6, Num 1. page 85, June 1992. However, the conversion accuracy (phonetic to Hanzi) of these methods is typically limited to around 80%.

The third category combines a phonetic-character input method with the additiion of non-phonetic letters. Non-phonetic letters are added to the phonetic letters to artificially discriminate characters with the same pronunciation. Examples include phonetic spelling with radical marks (British patent 2,158,776, issued Nov. 20, 1985, by C. C. Chen) and phonetic spelling with number of strokes (Chinese patent 1,066,518, issued Nov. 25, 1992, by G. Xie). These methods require memorizing artificial rules or counting number of strokes which slows down the speed of input substantially.

In addition to the "homonym problem," a "word boundary problem" exists when processing the Chinese language.

Although more than 80% of words in modern Chinese have multiple syllables (thus two or more Hanzi), there is no word separation in its writing system (in contrast with all European languages, and even Korean). Further, input of phonetic Chinese is usually performed syllable by syllable without accounting for word boundaries.

In spite of the wide recognition of multisyllable words and the lack of a standard way to delimit words at a word boundary, the definition and even the existence of words in Chinese is controversial. Furthermore, because Chinese is traditionally written a continuous string of Hanzi without word spacing, an ordinary Chinese person does not have a clear concept of what a "word" means. In many cases, it is unclear where a word boundary or delimiter, e.g. a space, should be placed. The controversy is exemplified by the following cases:

1. Compound nouns. In English, two independently valid words can be combined to form a compound noun, for example, blackboard or rattlesnake. As in English, controversy exists about whether these compound strings should be treated as one word or two words. Because there is no generally accepted precedence in China, controversy about compound nouns is much more severe. For example, the word "nanguangboyuan" (male announcer), as listed in Chinese Pinyin Vocabulary, may be considered as two words (nan guangboyuan), or even three words (nan guangbo yuan) by different people.
2. Affixes. All Chinese verbs can be appended with "syntax units" -le, -guo, or -zhe, which make them past, present prefect, or progressive tense. All adjectives can be appended with -de. However, these syntax units also appear as individual words called particles. Different schools of linguists treat these syntax units differently. Some schools treat these syntax units as "proper" affixes, i.e. part of the word to which they are attached. Other schools treat them as individual particles, i.e., separate words.

An affix is part of a word while a particle is an individual word. For example, while the noun endings -hua, -jia, -yuan, -xing, and -zhuyi are considered by most linguists as affixes in single words, so linguists consider them individual particles (separate words). On the other hand, endings such as -z, -r, and -tou are always treated as suffixes for nouns and not as individual particles.

3. Compound verbs. There is a class of verbs in Chinese which is very similar to the divisible verbs in German (die zerbrechbar Zeitwort), such as aufziehen, heraufziehen, etc. Those "divisible" verbs can use infixes, -zu- and -ge-, to become infinitives or past participles.

In Chinese, similar compound verbs can have infixes, -de- or -bu-, to mean "capable" or negative. Examples are, taiqilai (raise), which has versions of taideqilai (can raise) taibuqilai (cannot raise), very similar to the above German verbs. Moreover, the phrases "taiqi tou lai", taideqi tou lai", and "taibuqi tou lai" are similar sentence structures using compound verbs (such as "ziehen dein Kapf auf".) From this point of view, "taiqilai" should be one word. However, many linguists consider those syllables as separate words (tai, qi, lai), and write them separately.

As illustrated above, in the Chinese language it is often unclear where word boundaries should be placed.

In spite of the controversy, many multiple-syllable words are universally recognized as minimal linguistic units, or morphemes, such as: (b 1) nouns "gada", "putao", "feiji", etc.; (2) verbs "zhuanyou", "xingwu", etc.; and (3) adjectives "heised", "pangdad", etc. Also, many phrases are universally accepted that consist of multiple words. For example, although sometimes "dianzigongye" can be considered as one word, no one would consider the phrase "fazhan dianzi dongye" as a single word. There are popular four-syllable idioms that are universally considered as words, although in different writing styles of Pinyin, hyphens may or may not be used. For these classes of words, unique word boundaries are universally recognized.

As described above, the lack of universally accepted orthographic rules and the lack a word-separation habit for Chinese, make it very difficult to develop a easily used standard for computer input and processing of Chinese language text—no particular linguistic school is universally followed. Even by following a narrow definition of words (i.e., treating many compound words as phrases, and treating many affixes as particles), some ambiguities will remain. By making a broad definition of words, (i.e., treating many compound words as single units, and accepting many affixes as part of words), the accuracy of identification will improve, but the volume of vocabulary required to be stored in the computer memory would be too large to account for every single unit word and words with all affix combinations.

Textbooks of spoken Chinese for foreigners are written in a spelling form called Pinyin, where multiple syllable words are considered as basic units. Pinyin uses Roman characters and has its vocabulary listed in the form of multiple syllable words. A Chinese Pinyin Vocabulary was published in 1964. A revised edition was published in 1989 by Language Press, Beijing, China, which contains some 60000 word entries. Rules of orthography for Chinese written in Pinyin form, that define the word boundaries, were published in 1984.

OBJECTS OF THE INVENTION

An object of this invention is to provide an improved computer system for entering and processing phonetic Chinese and Hanzi on a computer.

Another object of the present invention is to provide an accurate computer system, with a relatively small vocabulary (memory) requirement, and a process for converting phonetic Chinese (Pinyin or BPMF) input to character writing (Hanzi) while accommodating different linguistic theories and/or different personal habits of word separation in the Chinese language.

Another object of this invention to provide convenient and efficient designs of computer keyboards to facilitate entry and processing of Chinese language text.

Another object of this invention to provide a design of an extended ASCII code to facilitate the storage, printing, and transmission of a phonetic Chinese based information stream, with no interference with English and square-character (Hanzi) streams in the GB2312-80 form (a Chinese Government standard for communicating Chinese characters).

Another object of this invention to provide a computer processing system for phonetic Chinese that provides automatic error detection and correction.

Another object of this invention to provide a computer processing system for phonetic Chinese that allows a mixed Chinese and non Chinese (e.g., English) text to be processed.

SUMMARY OF THE INVENTION

The invention is a system and method for accurately and efficiently entering phonetic Chinese (Pinyin and BPMF) into a computer system and for accurately converting the phonetic input into the Hanzi form. The system has a novel keyboard with diacritic keys (and corresponding ASCII coding) that permit the user to annotate each entered phonetic text syllable with a diacritic that indicates the tone of the syllable. A process executing on the system determines that a syllable has been entered when a diacritic (or delimiter) key is struck. An entered phonetic syllable is then compared to a list of acceptable phonetic syllables and abbreviations. If the entered syllable is on the list, the correctly spelled and accented syllable is stored in memory and displayed on a phonetic portion of a graphical display. The process continues for succeeding syllables until a delimiter is entered.

Upon encountering a delimiter, the word string (defined as the string of characters between two delimiters) is processed to determine the proper Hanzi characters that represent the word(s) in the word string. The word string (or each word in the word string) is compared to a dictionary of phonetic words. If the word string has a unique Hanzi translation, the Hanzi translation is stored in memory and displayed on a Hanzi portion of the graphical interface. If the word string has no matches in the dictionary, a morphological analysis is done, i.e., any standard affixes (as identified on an affix list) are removed from the word string. The remaining word string (root) is re-analyzed. If the root still has no matches in the dictionary, the root (remaining word string) is decomposed into constituent components/words. If the constituent components have unique matches in the dictionary, the Hanzi translation of these unique constituent components/words is stored in memory and displayed on the Hanzi portion of the graphical interface.

If the word input or any constituent components/words have ambiguous translations (non unique matches in the dictionary), a syntactical analysis is done. Words in the word string are classified as either function words (those on a function word/affix list and having no toned syllables) or notional words (those having at least one toned syllable.)

(Note that for the purposes of this invention, function words, particles, and affixes are used and treated the same way.) The function words are translated unambiguously and also determine the structure of the remaining word string (root) input. Ambiguity of any notional words is then reduced or removed based on use of the notional words with the translated function words. Any remaining ambiguity of notional words is removed by a statistical model.

The phonetic text can be entered into the system by apparatus other than the keyboard, e.g. through a network, magnetic media, or acoustic system. Mix text, both Chinese and non Chinese words, can be processed by delimiting the non Chinese words with a special character, e.g. a space.

BRIEF DESCRIPTION OF THE DRAWINGS

FIG. 3 is a preferred embodiment of an ASCII code data structure which includes the tone diacritics in the lower 7 bits and all usable vowels with tone diacritics in the higher 7 bits.

FIG. 8 is a table with a preferred list of Chinese function words, particles, and affixes treated as function words.

DETAILED DESCRIPTION OF THE INVENTION

Figure 1:
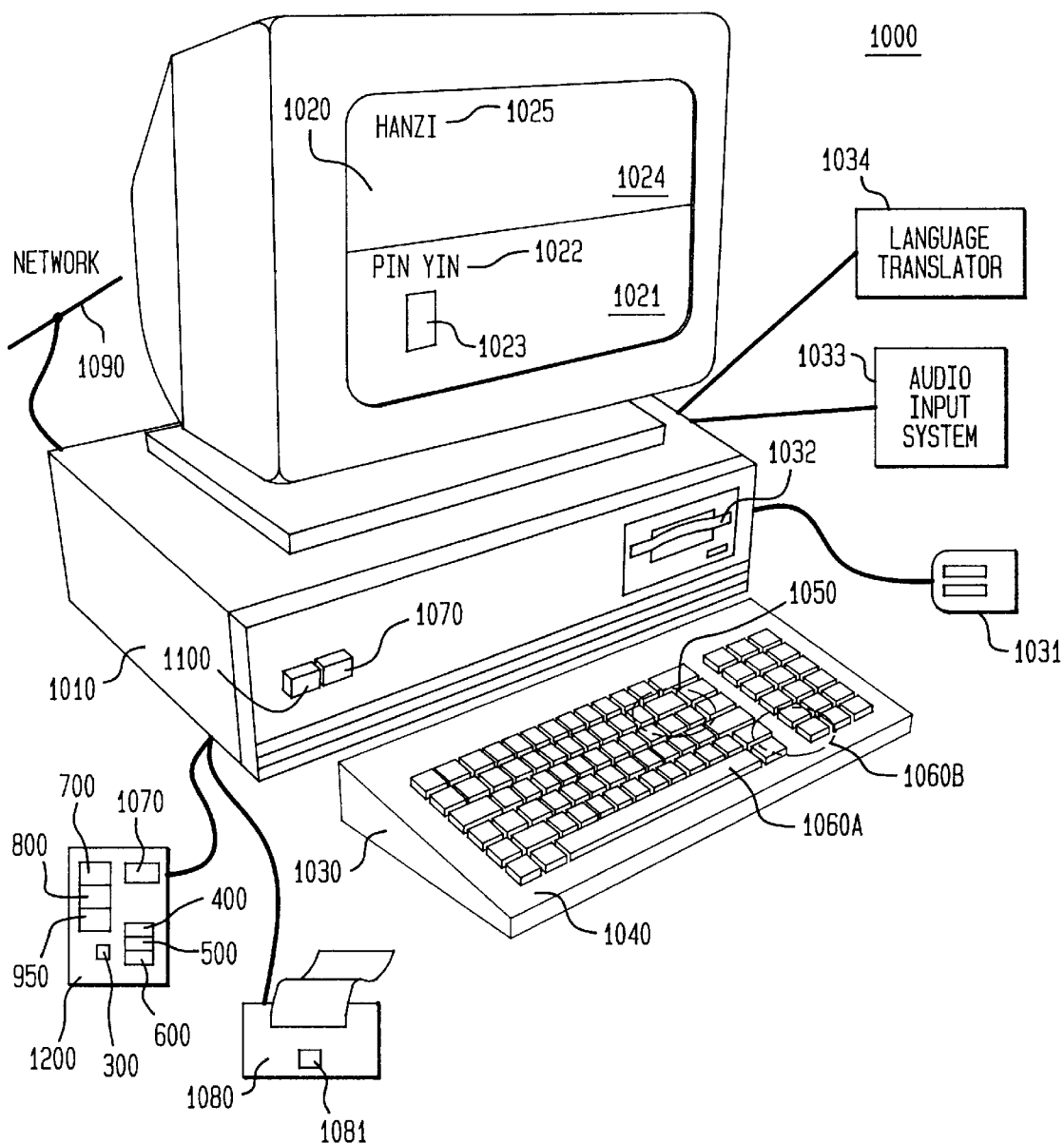
FIG. 1 is a block diagram a preferred embodiment or the present system.

FIG. 1 shows a block diagram of one preferred embodiment of the present system 1000. The system 1000 includes a graphical interface 1020 capable of displaying Chinese characters and English text, a CPU 1010, a main memory 1100, and memory storage 1200. A keyboard profile 1070 is stored in the main memory 1100 and/or memory storage 1200. The system 1000 has a pointing device 1031, such as a mouse, and can be connected to a network 1090. An IBM RS/6000 is one embodiment of the CPU 1010, memory (1100, 1200), and graphical interface 1020.

Also shown is the novel keyboard 1030. The keyboard includes tone diacritics keys 1050 and the syllable input keys 1040 that are standard Roman characters. Alternative tone keys 1060A,B are also possible. Tones keys 1060A can be placed on a split space bar. Tone keys 1060B can be added above the standard arrow keys. Alternative preferred embodiments of the novel keyboard are discussed in the description of FIGS. 2A–2D.

Included in memory storage 1200 and/or or in main memory 1100 is a novel data structure 300 used for converting key strokes of the keyboard 1030 to encoded (e.g. ASCII) characters and diacritics that are stored, i.e. registered, in the memory (1100, 1200). Data structures 700, 800, and 950 are also stored in memory 1200. They include a Chinese syllable list 700, a function word/affix list 800, and a Chinese dictionary or vocabulary 950.

Novel processes 400, 500, and 600 are included in memory (1100, 1200.) Process 400 is a method for entering (inputting) phonetic Chinese into the system 1000 and optionally defining word boundaries. (Note that in this disclosure phonetic Chinese will be referred to as Pinyin without loss of generality.) Process 500 is a method for morphologically analyzing strings of Pinyin text/words to determine unique Hanzi translations. Process 600 is a method of syntactical analysis used by process 500 for resolving ambiguous strings/words, i.e., those that have more than one Hanzi translation. The data structures 300, 700 and 800 are described in FIGS. 3, 7, and 8 respectively. Processes 400, 500, and 600 are described in FIGS. 4, 5, and 6, respectively.

Typically, the user uses the keyboard 1030 to enter Pinyin text input with appropriate diacritics (see below) into the system 1000. Using the data structure 300 and process 400, the system 1000 displays the Pinyin characters 1022 (Roman letters, diacritics, punctuation, etc.) on a first section 1021 of a split screen on the graphical interface 1020. Using processes 500 and 600, the system 1000 analyses the Pinyin input, converts the Pinyin into Hanzi, and displays the Hanzi characters 1025 on a second section 1024 of the graphical interface 1020. Note that using processes 500 and 600 and additional language translation apparatus 1034, the system 1000 can convert the entered Pinyin, coded or marked with diacritics, 1022 into other languages, like English.

The system 1000 can also include components other than the keyboard 1030 that permit the entry of text, e.g., a string can be transmitted over the network 1090. Other inputs include components 1033 for audio text input. These components would have the appropriate drivers to connect to system 1000. See U.S. patent application Ser. No. 08/404,786 entitled STATISTICAL ACOUSTIC PROCESSING METHOD AND APPARATUS FOR SPEECH RECOGNITION USING A TONED PHONEME SYSTEM to Chen et al. filed on Mar. 15, 1995 which is herein incorporated by reference in its entirety. Strings of Pinyin coded or marked with the appropriate diacritics can also be entered into the system 1000 using other well known methods including magnetic media 1032, e.g. diskettes.

When entering text, diacritics are used to demarcate stressed syllables (and in some embodiments unstressed syllables) and tone values in a phonetic representation of the Chinese language. (See process 400.) A diacritic is a symbol that represents a tone of a syllable. In the present invention, syllables of words that have a tone are annotated with a diacritic that indicates the syllable has a tone. Also, the diacritic indicates the type of tone. There are four tone types in Mandarin (standard Chinese). They are: high, rising, low, and falling. Some linguists include a fifth tone (diacritic) called the "untone or no tone."

During the entry (input) of text 400 into the system 1000, tone diacritics are added on accented syllables. With this coding or demarkation, the difference between notional words and function words, particles, and affixes immediately becomes clear in further processing of the text (500, 600). (Words with accented syllables are notional words and function words, particles, and affixes are all listed 800.)

In an alternative embodiment, a "no tone" diacritic is added after each unaccented (untoned) Chinese syllable (including the function words, particles, and affixes). This embodiment is useful when "mixed language/text" is entered, i.e. English or other non Chinese text is included with the Chinese text input. Since the non Chinese text is uncoded (unmarked) with a diacritic, the Chinese words/ syllables (marked with diacritics including the untone diacritic) can be distinguished from the unmarked non Chinese text. Non Chinese text is also delimited with special delimiters, e.g. with spaces between the words.

During further language processing, i.e., translation, analysis, and/or printing, diacritics demarking the accented syllables in a syllable string and indicating the type of the tone of each accented syllable, are used by the invention to parse the phonetic representation (Pinyin) of Chinese into words and sentences. (See processes 500 and 600.) Rules are applied to parse the phonetic representation by dividing the phonetic representation of the Chinese sentence at the points where there are function words, particles, and/or affixes. The system 1000 efficiently does this because there are a relatively small number, i.e., under 100, of known and identified function words (and particles/affixes) in each Chinese dialect. Therefore, a relatively small amount of computer memory is needed to store all useful function words and particles/affixes 800.

The system 1000 accurately determines word meanings and sentence structure. (See processes 500 and 600). First the function words (and particle/affixes), that have a unique and unambiguous translation in terms of meaning, use, and tone (none), are translated. The function words (and particles/affixes) are also used to define the sentence structure. Using the translation of the function words (and particles/affixes) and the defined sentence structure, meanings of the other (notional) words in the sentence can be determined.

Again, for the purposes of this invention, function words, particles, and affixes are used and treated in the same manner. This is because often in Chinese writing no distinction is made because there is no clear word boundary. Function words, particles, and affixes also have a similar tone structure. A preferred list of function words, particles, and affixes is stored in the system memory (1100, 1200) and is presented below in FIG. 8.

One novel feature of the present invention is a new keyboard designed specifically for Pinyin Chinese input and/or for mixed text processing (Pinyin Chinese together with non Chinese languages, e.g. English.) The keyboard provides a way of inputting Pinyin syllables with diacritics. FIGS. 2A–2D are examples of alternative preferred embodiments of keyboards 1030 specifically designed for Pinyin input. These keyboards 1030 enable easy and rapid entry of Pinyin into the system 1000. The standard United States English keyboard is not convenient for Pinyin input and also does not provide the ability to input tones/diacritics.

Figure 2A:
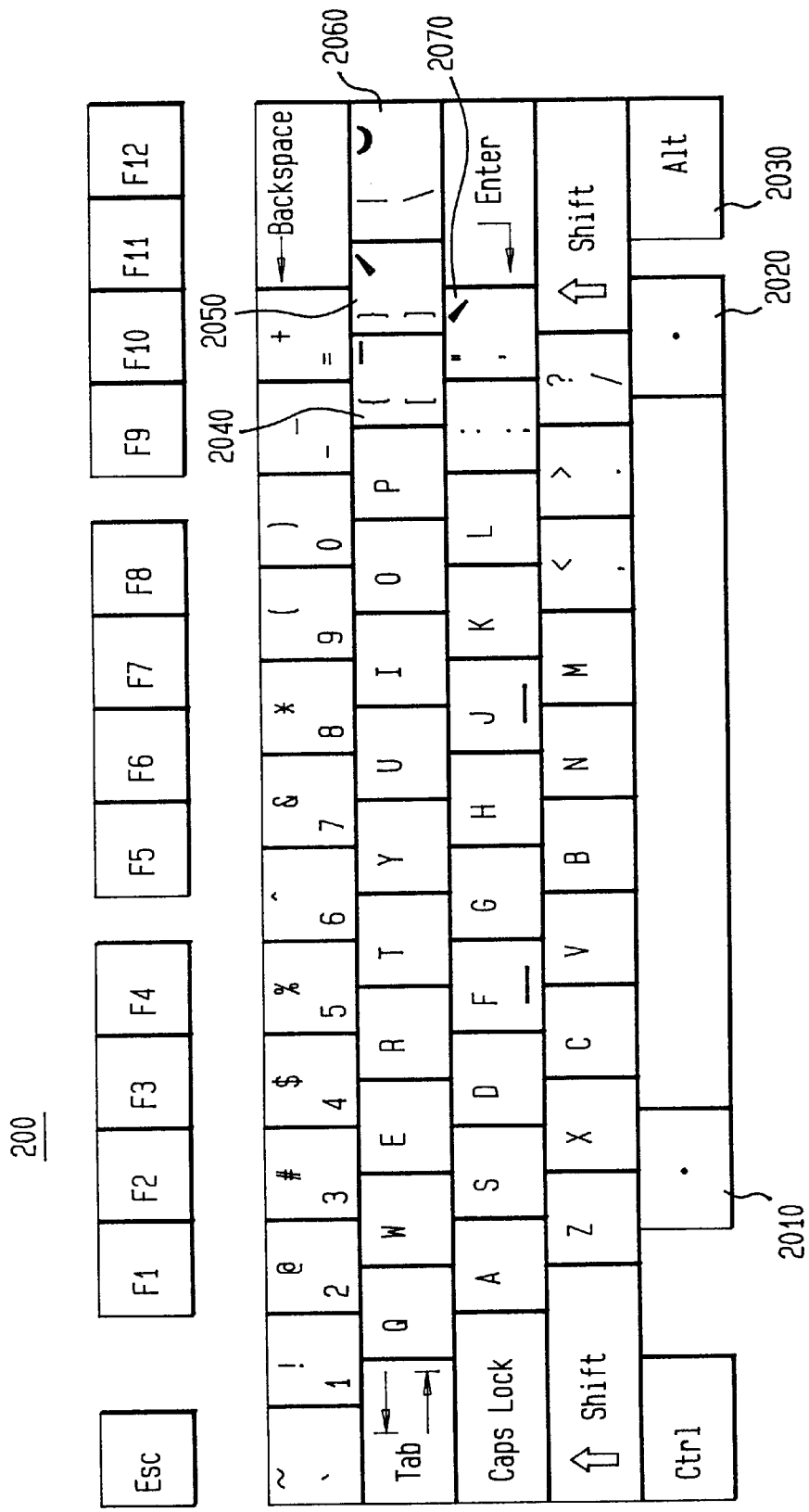
FIG. 2A shows one preferred embodiment or a keyboard used in the present system.

FIG. 2A is a drawing of a novel keyboard (1030, 2000) that is a novel modification of a US English keyboard. In this particular preferred embodiment, some of the keys are used as tone (diacritic) keys 1050 while other keys 1040 are used in the traditional way as syllable keys 1040 for entry of Pinyin and other language (English) characters. In one preferred embodiment, some of the rarely used punctuation keys are assigned as the tone keys 1050. As a non limiting example: the "[,{" key is assigned as the high tone (diacritic) key 2040; the "], }" key is assigned as the rising tone (diacritic) key 2050; the "\A, /" key is assigned as the low tone (diacritic) key 2060; and the "",'" key is assigned as the falling tone (diacritic) key 2070. For processing of purely Pinyin text, these four diacritic keys (2040–2070) are adequate because untoned Pinyin syllables and function words (and particle affixes) would be coded or marked with no diacritic. However, in embodiments that are used to process Pinyin text in combination with non Chinese (English) text (and other preferred embodiments), another diacritic key, the untone (diacritic) key 2010, is added. For example, one of the "alt keys" 2010 can be used for this function. Since in processing mixed text (both Chinese and non Chinese together) the untone key will be used frequently, a second untone key 2020 can be added at the second "alt key" location on the standard English keyboard to provide additional finger access. In this embodiment, the "alt key" would be reassigned to one of the duplicate "control keys" 2030. The English keyboard can be easily modified to include equivalent alternative assignments of keys to provide diacritic inputs 1050.

Figure 2B:
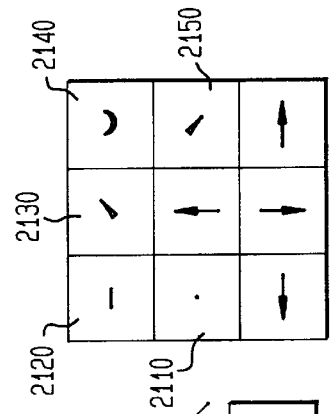
FIG. 2B shows an alternative embodiment of part of a keyboard with tone keys.

FIG. 2B is an alternative preferred embodiment 2100 of a modified English keyboard 1030 that has diacritic keys 1060B for the entry of diacritics in Pinyin text processing. In this embodiment 2100, diacritic keys 1060 are added to the English keyboard 1050 above the standard "arrow keys." Again the diacritic keys that would be added include the high tone (diacritic) key 2120, rising tone (diacritic) key 2130, low tone (diacritic) key 2140, and the falling tone (diacritic) 2150 key. The optional untone (diacritic) key 2110 would be added for mixed text (or other) processing.

Figure 2C:
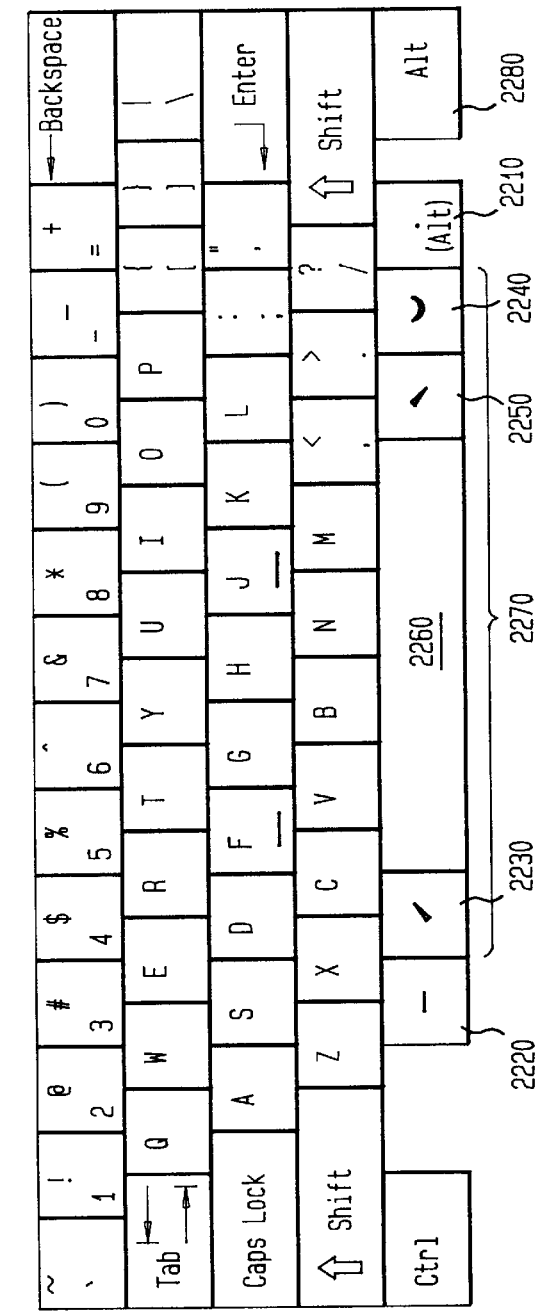
FIGS. 2C and 2D show alternative preferred embodiments of keyboards used with the present system where each keyboard has split sections of the space bar used as tone keys.

FIG. 2C is a drawing of an another alternative preferred embodiment 2200 of the keyboard 1030. This embodiment 2200 has a split space bar 2270 that allows all keys (or all but one or two) of the US English keyboard layouts 1040 to be kept intact. In one preferred embodiment, the space bar 2270 is split into four sections (2230, 2240, 2250, 2260). The leftmost section 2230 of the space bar is assigned to the "rising" tone (diacritic) 2230. The large section 2260 next to it is used as the space bar 2260. The two smaller sections (2240, 2250) on the right hand side are assigned to the "falling" 2250 and "low" 2240 tones (diacritics), respectively. The high tone (diacritic) 2220 is assigned to one of the "alt keys."

Such an arrangement is based on ergonomics. The thumbs are the most important fingers in piano playing, but much under utilized in typing. This design of the Chinese keyboard will utilize the thumbs much more efficiently in tone input. The new space bar 2260 is located at the center of the keyboard, namely, between "F" and "J" keys. Both thumbs can be used to press it comfortably. Thus, the size reduction of the space bar will not affect typing of English at all in mixed text processing. By curving a thumb to the palm, the four tone keys (2220, 2230, 2240, 2250) can be accessed easily.

For pure Pinyin input, no untoned key 2210 is needed. In this embodiment, the "space bar" key 2260 acts as the "untoned" key for the Pinyin only input. In FIG. 2C, the position of the falling tone 2250 and the low tone 2240 are reversed from their common linguistic order (the third and the fourth tones) because falling tone is used about a factor of two more frequently than the low tone. This "reversing" will reduce the fatigue and improve efficiency.

For mixed text processing (Chinese together with non Chinese), and some preferred embodiments of pure Chinese text processing, the untone key 2210 is added. In this preferred embodiment, the untone key (diacritic) 2210 is assigned to the other "alt key." One of the control keys 2280 is reassigned as the "alt key."

Figure 2D:
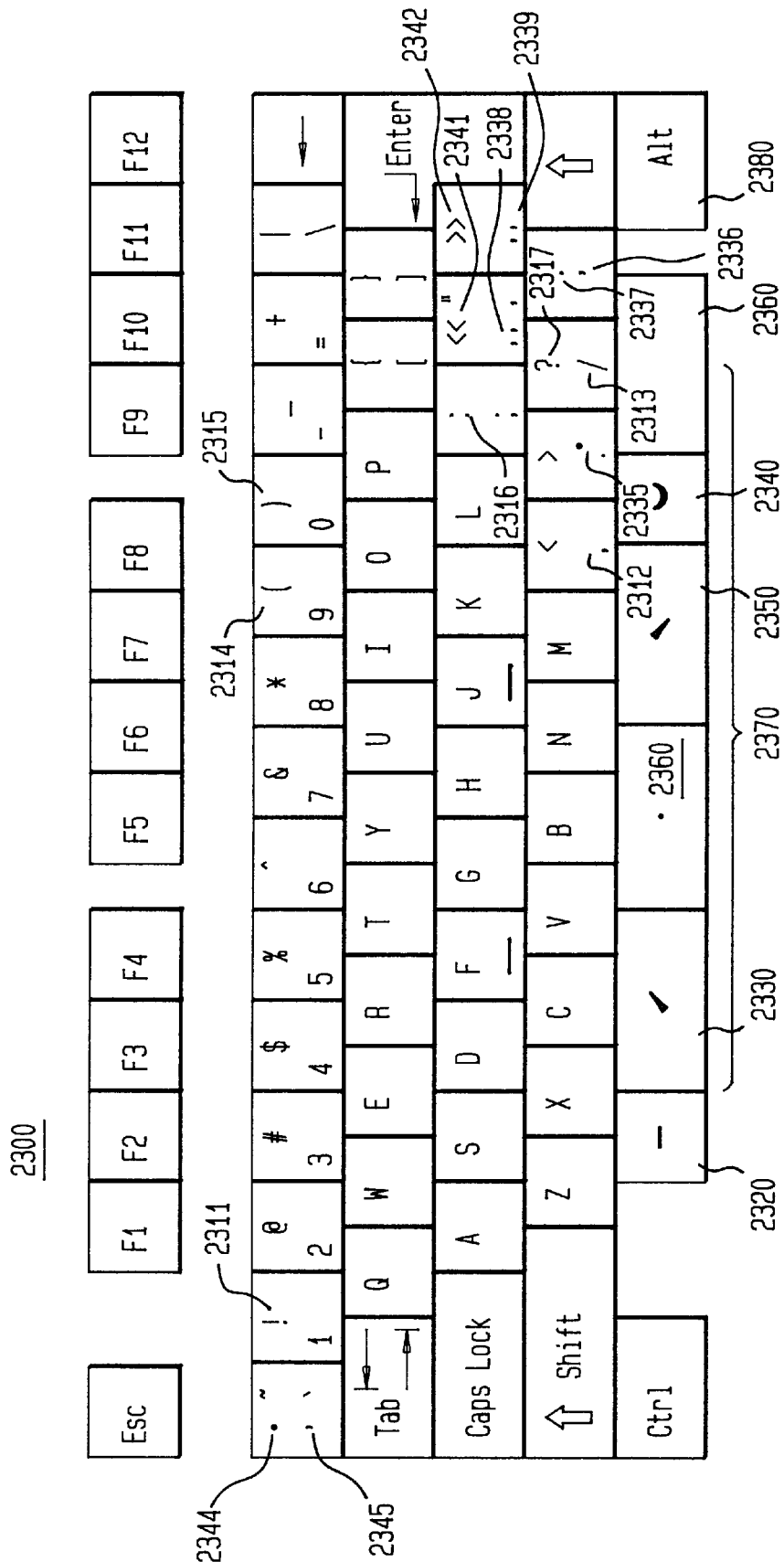

FIG. 2D shows another preferred embodiment 2300 of a keyboard 1030. This embodiment uses a split space bar 2370 with rising 2330, falling 2350, and low 2340 tones (diacritics) positioned as in keyboard 2200. However, in this keyboard 2300, the center, largest portion 2310 of the space bar 2370 is assigned to the untone tone (diacritic) 2310. The space function 2360 is provided in the position of one of the "alt keys." This is especially useful when the keyboard 2300 is used to enter mixed text. The other "alt key" is assigned the high tone (diacritic) 2320. Again one of the "control keys" is reassigned as an "alt key" 2380. This embodiment positions the untone key 2310 in a very convenient location for access of both thumbs. This is helpful when the system 1000 is processing mixed text because the untone key 2310 will be frequently used.

Keyboard 2300 can be enhanced by adding additional marks on the keys. For example, in Chinese, the left quotation mark 2338 and right quotation mark 2339 are different and are each given a key. Left 2341 and right 2342 title marks are added along with a bullet 2344, apostrophe 2345, and decimal point 2337. These marks are also used when entering mixed text. A phase mark 2336, used as a delimiter in Chinese is also provided a key location.

Key assignments and reassignments are performed using well known methods. For example, the profile of the keyboard 1030 is a file 1070 in the memory (1100, 1200) of the system 1000 that defines the functions of the keys. In the RS/6000 this is called the "keyboard translate table 1070." This table 1070 assigns a character, typically in ASCII code, or a control to each key on the keyboard 1030. By changing the assigned key codes in this table 1070, the functions of the keys on the keyboard 1030 change.

The user enters (inputs) Pinyin or mixed text into the system by using the keyboard 1030. After the user enters a Chinese (Pinyin) syllable, the user enters the appropriate diacritic associated with the syllable. When pure Pinyin is entered, no diacritic (or alternatively a space) is entered for unaccented syllables (and function words). When mixed text is entered (or in alternative preferred embodiments used to enter Pinyin), the user enters an untone diacritic after each unaccented syllable (and function word). Spaces (or equivalent word boundary delimiters) are entered after non Chinese words. Spaces delimiting Pinyin (Chinese) words with generally accepted word boundaries improves the accuracy of the system 1000. However, it is not necessary to delimit Chinese words for the invention to operate. See process 400.

The Pinyin (or mixed text) input is stored in the system 1000 memory (1100, 1200). In a preferred embodiment, the input is encoded in an ASCII format. A standard ASCII code table that has codes for English characters and/or codes for GB2312-80 Hanzi is modified to include diacritics. In a preferred embodiment, the high, rising, low, and falling diacritics are coded for the upper and lower cases of each commonly accented vowel so that proper diacritic can be displayed/printed over the vowel in a displayed/printed Pinyin syllable.

FIG. 3 is one preferred embodiment of a data structure 300 for the ASCII coding for Pinyin or mixed input. The block of memory 300 has 256 memory locations. These locations are numbered from 0 to 255. The number is also the ASCII code that is assigned to each of the locations/ASCII codes.

The ASCII code is made of a single bytes of information, a lower 7-bit section (representing locations 0–127) and an upper 7-bit section (representing locations 128–255). A single character, punctuation, or control function is assigned to a memory location. For example, the upper case Roman letter "B" is assigned location 66, the "escape" function is assigned location 27, and the "!" is assigned to location 33.

Although the coding of the Roman letters, punctuations, and numerals are well-defined, there are many optional spaces in the ASCII code. Individual countries can assign special symbols at these optional spaces.

Each of the diacritics is represented by a tone code or mark. In a preferred embodiment, each of the five (or four) tone codes (marks) are assigned to memory location with numbers (ASCII code) in the lower half of all the ASCII code data structure 300 (the seven bits from 0 to 127.) These memory locations are used for communication. Therefore, by assigning the diacritics ASCII codes with numbers between 0 and 127, the tone codes can be communicated over a network 1090. In this non limiting example shown in FIG. 3, the tone code (mark) no tone 301, high 302, rising 303, low 304, and falling 305 are assigned the locations with the ASCII code 2, 3, 4, 5, and 6, respectively. These are the locations of the Pokers in US ASCII coding.

In this preferred embodiment, a location and an ASCII code is also assigned to each vowel (both upper and lower case) for each diacritic (high, rising, low, and falling) that the vowel can have. The no tone case can use the English vowels that are located in the lower 7 bit section of the ASCII code. In addition, upper case "I" and upper case "U" with diacritics are omitted since no phonetic syllable begins with these vowels. Accordingly there are 32 vowel designations with diacritics to be assigned ASCII codes. These vowels with diacritics are assigned ASCII codes (128–159) in the upper half of the data structure 300, i.e. between numbers 128–255.

Giving vowels with diacritics a unique ASCII code is useful when displaying the Pinyin syllables on the graphical interface 1020 and in printing the Pinyin syllables. The system 1000 uses the Pinyin syllable entered with a following diacritic (301–305) to display/print a correctly spelled syllable with the diacritic properly over the vowel of the syllable. Therefore, by using the vowels assigned with diacritics in data structure 300 locations 128–159, the system 1000 is able to print/display Pinyin syllables in the traditional way—with the diacritic over the vowel. For example, the Pinyin syllable entered with key strokes Pin' will be displayed/printed as Pi'n.

The advantage of this arranging the vowels with diacritics in the upper half of the data structure 300, with ASCII codes 128 to 159, is that the GB code only uses the upper half of ASCII code data structure 300 from 160 to 255. Therefore, the Pinyin vowels with diacritics can be stored and transmitted together with GB code (and the lower 7 bit of the ACSII code).

Figure 4:
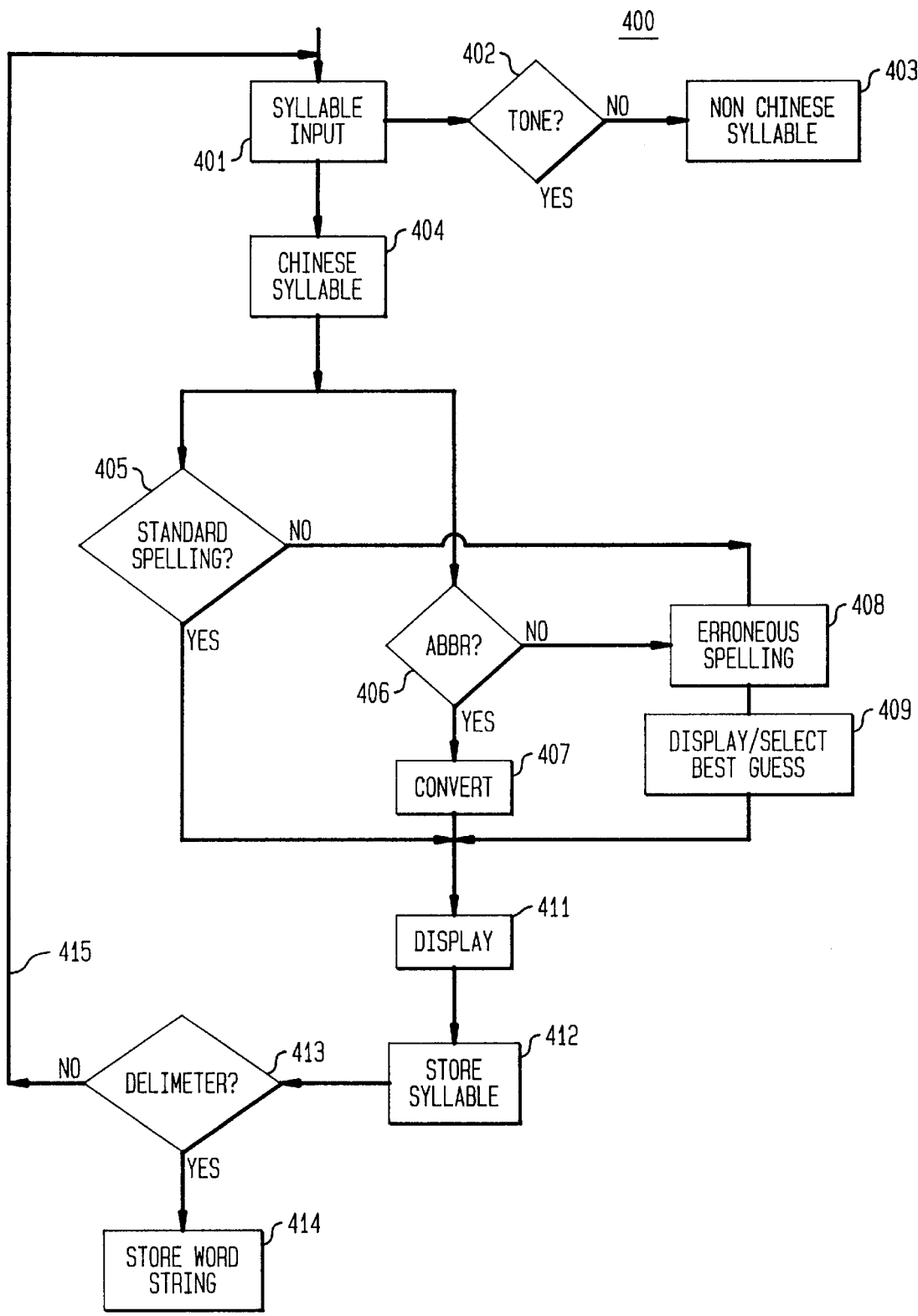
FIG. 4 is a flow chart showing a preferred process for keyboard input that produces a Pinyin word registration in the memory.

FIG. 4 shows a novel process 400 of entering a Pinyin syllable into a tangible media like a computer memory (1100,1200) or a display (1020). In a preferred embodiment, process 400 provides a spell checker and an automatic error detection and correction process that is used to check the syllables entered into the system 1000 by key strokes (or other methods.) Process 400 also allows a mixture of Chinese and non Chinese (e.g., English) text to be entered, treated, and stored with minimal effort. An input unit is the input process 400 executed by the system 1000.

In step 401, the user enters a syllable (here either Chinese or non Chinese) through the keyboard 1030 with key strokes. If the syllable is Chinese, a diacritic representing the tone of the syllable is entered following the syllable. (Here the untone diacritic is used in text entry.) No diacritics are entered after non Chinese words, e.g. English. Further non Chinese words can be identified 402 because they are delimited by special delimiters, e.g. a space.

In the case of pure Chinese text, it is unnecessary in some embodiments to enter diacritic after no tone syllables or function words. Although not required in pure Chinese text entry, system 1000 accuracy improves by entering delimiters for word boundaries between Chinese words where a well established convention for word separation is known. This can be done by entering a delimiter like a space or other code (e.g. double diacritic, "esc") at the word boundary. In this case, a list of Chinese words with well established word separation can be referenced in 403 to distinguish them from non Chinese syllables/words.

When the end of a syllable (or non Chinese word) is reached, the system 1000 reads a diacritic, e.g. a depressed tone key 1060 (or space.) In some alternative embodiments where pure Chinese text is being processed, the no tone diacritic can be eliminated. In these cases, some untoned (and un marked) syllables will be appended to one another. To parse these syllables 404, the string is compared to a dictionary of syllables 700. The longest syllables in the dictionary 700 are compared to the entered string first. If part of the entered string matches the longest string, that matched string is used as a syllable input and deleted from the entered string. The process is repeated on the remainder of the entered string. If no match is found on the longest strings in the dictionary of syllables 700, the next longest syllable strings in the dictionary of syllables 700 is compared. The process is repeated until all the syllables of the entered string have been matched. This process is call the "longest string match" algorithm and examples of this are well known. See "Chinese text segmentation for text retrieval: achievements and problems" by Z. Wu and G. Tseng, Journal of the American Society for Information Science, Vol. 44, No. 9, October, 1993, pages 532–542 which is herein incorporated by reference in its entirety.

In some preferred embodiments of entering pure Chinese text and in mixed text processing, the no tone key is used to mark unaccented syllables in Chinese. In these embodiments, all Chinese syllables are coded (marked) and unambiguously delimited by a diacritic. Therefore, the Chinese syllable boundaries are unambiguously marked. This embodiment permits Chinese syllable abbreviations to be used since the abbreviations are also unambiguously delimited and are uniquely identified by being added to the syllable list 700. Use of syllable abbreviations greatly reduces the number of key strokes required to enter phonetic Chinese text.

In step 402, used in mixed text processing, the system 1000 determines whether or not the syllable is a Chinese syllable. If there is a diacritic (including the no tone diacritic) after the syllable, the syllabic is Chinese 404. If there is no diacritic, the syllable (word) is non Chinese, e.g. English 403. Non Chinese words can also be identified 403 by their delimiters. Non Chinese words can be further processed, e.g. spell checked, by known systems that process these languages.

After a tone key (either one of the four tones keys or the "untoned" key) is pressed, the computer recognizes that the preceding letters represent a Pinyin syllable 404 and the syllable is spell checked 405, checked as an abbreviation or alternate spelling 407, or error checked 408. These steps (405, 407, and 408) use a Chinese syllable list data structure 700 shown in FIG. 7.

Figure 7:
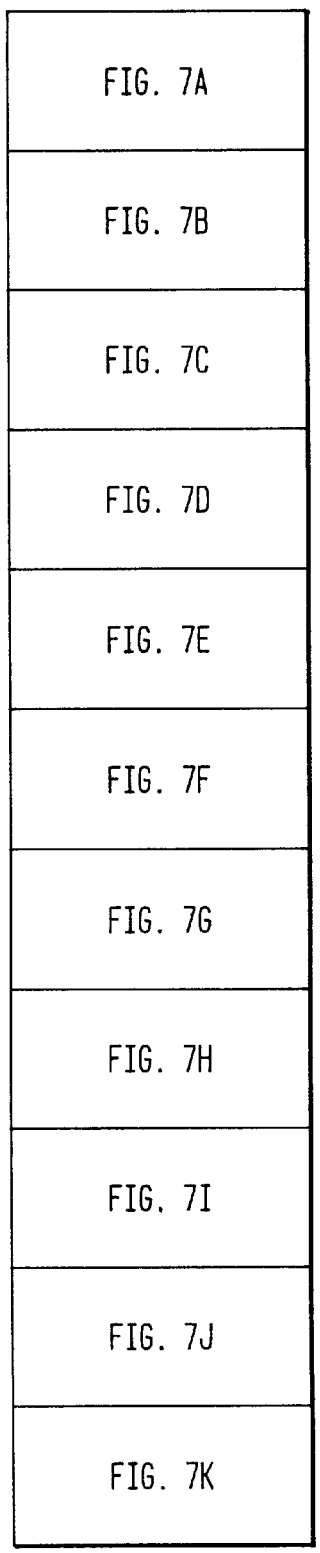
FIGS. 7A–7K are tables with a preferred list of Chinese syllables having one code form for each syllable.

The Chinese syllable list 700 in FIG. 7 is one preferred syllable list used for Mandarin Chinese. Because there are altogether just over 1300 syllables in Mandarin (including different tones), it is convenient to code those syllables with a small portion of a two-byte code space (65536 spaces). Each of the syllables is assigned a unique two-byte code or "short integer". Specifically, the ASCII code string representing each syllable is assigned a two-byte code in the Chinese syllable list 700. For example, the Mandarin Pinyin syllable Pi'n is assigned the two-byte code "814." Each syllable corresponds to a standard spelling form, including the tone diacritics on top of the proper vowel. To add abbreviations to the list 700, the abbreviations are assigned the same two-byte code as the syllable that is abbreviated. For example, the abbreviation "d" would be assigned 212, the code on the syllable list 700 that represents "de'", the syllable that "d" abbreviates. Syllable list 700 takes a relatively small amount of memory (1100, 1200) space.

After a Chinese syllable 404 is encountered, the system 1000 searches the Chinese syllable list 700 to find a match. If a match is found, the syllable 404 was entered with a standard spelling 405, i.e. the spelling on the Chinese syllable list 700, and the entered key stroke string is replaced with the two-syllable code of the matched word on the Chinese syllable list 700. For example, if the Chinese syllable Pin' is entered, the system 1000 represents the key strokes with the ASCII code string {80, 105, 110, 6}. See FIG. 3. When checking the Chinese syllable list 700 for a match 404, the system finds that this string corresponds to Pi'n that is represented by the two-byte code 814. See FIG. 7. Thus the two bit code 814 replaces the ASCII code string for this syllable in memory. Therefore, if a standard spelling is detected 405, the entire syllable is stored 412 in memory 1010/1020 as one of the 1300 Chinese syllables (by a two-byte code) and displayed on the monitor 411, with the tone diacritics correctly on top of the vowel. This Pinyin display 411, is shown in the region 1021 of the graphical interface 1020 that displays Pinyin.

In like manner, if the user enters an abbreviation or shorthand spelling for a Chinese syllable, the ASCII codes representing the shorthand spelling are compared 406 to the entries in the Chinese syllable list 700. If there is a match, the shorthand (abbreviated) syllable is converted 407 to the proper, unabbreviated Pinyin syllable form by replacing the entered ASCII codes of the shorthand spelling with the two-byte code corresponding to the proper, unabbreviated Pinyin syllable. Again, abbreviations are added to the Chinese syllable list 700 with codes that will print the full syllable that is abbreviated.

Some example example abbreviations or shorthand spellings of Chinese syllables follow. For example, "zi", "si", "ci", "ji", "qi", and "xi" can be spelled as "z", "c", "s", "j", "q", and "x" without any confusion. Similarly, "yi", "wu", "yu" can be spelled as "i", "u", and "v" without confusion. Other short-hands such as "shg" for "sheng", "xg" for "xing", "qag" for "qiang", "jo" for "jiao", etc, can be recognized without ambiguity.

In syllables with syllable separation marks, the syllable separation mark, such as that in "Xi'an", can be avoided altogether in typing, although it should appear during display. Using the present system 1000 and process 400, the above examples of shorthand typing are so convenient that no learning is required. With a little learning the number of shorthand syllables can be increased (added to the Chinese syllable list 700.)

If an erroneous spelling is detected 408, i.e., there is not match in table 700, the most probable syllable is displayed 409. This is done by presenting a menu of probable choices, i.e. best matches 1023, selected from the Chinese syllable list 700. The user selects 409 the proper syllable from the menu by using a selection apparatus, e.g., a mouse 1031 or a key. As before, the computer codes this selected syllable as a two-byte value and stores it in the memory 412.

If a delimiter, e.g., a space bar, carriage return, or punctuation key, is not encountered 413, the process 400 repeats 415 for the next syllable. If a delimiter is encountered the entire string is stored as a word string 414. On the monitor, the correct Pinyin spelling of this word string is displayed in the Pinyin portion 1021 of the graphical interface 1020. Note that the word string 414 between delimiters is treated as a single word when the delimiters are entered (according to a generally accepted convention) and the word will have unique word boundaries coded or marked by the delimiters. However, the word string 414 can include two or more words (constituents) and/or affixes if the delimiters were not placed at each of the constituent word boundaries, e.g., when there are no generally accepted word boundaries to delimit the constituent words.

In step 414, the text, in the coded Pinyin form, also can be printed as Pinyin syllables using a printer 1080 with a special read only memory 1081, ROM, which converts the two-byte codes of table 700 into a string of Roman letters with tone symbols on the proper vowel of the required syllables. The text then becomes a continuous and readable printout in the Pinyin form, same as in all textbooks on spoken Chinese for foreigners.

Figure 5:
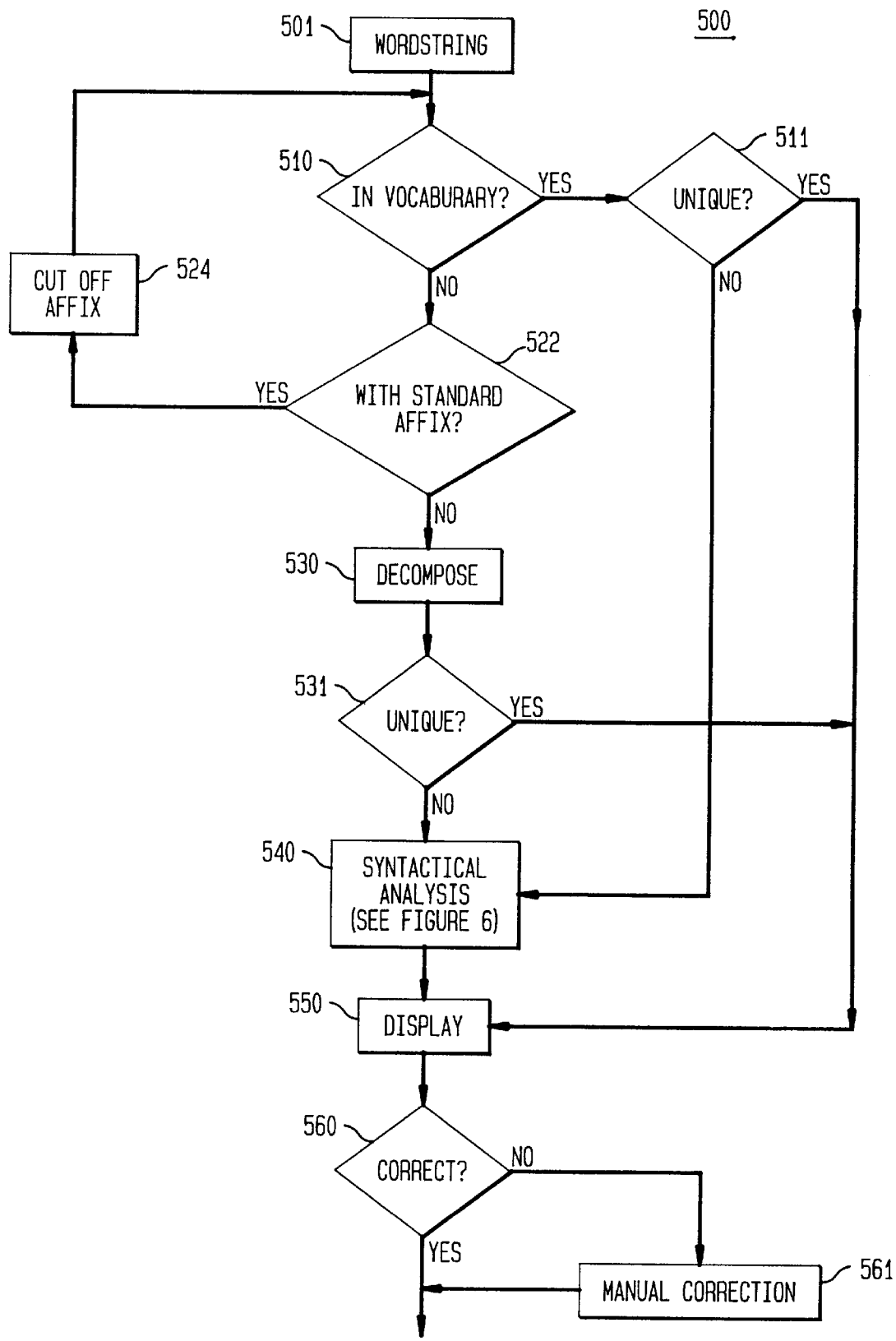
FIG. 5 is a flow chart showing a morphological analysis and decomposition process for Chinese words written in Pinyin form.
Figure 6:
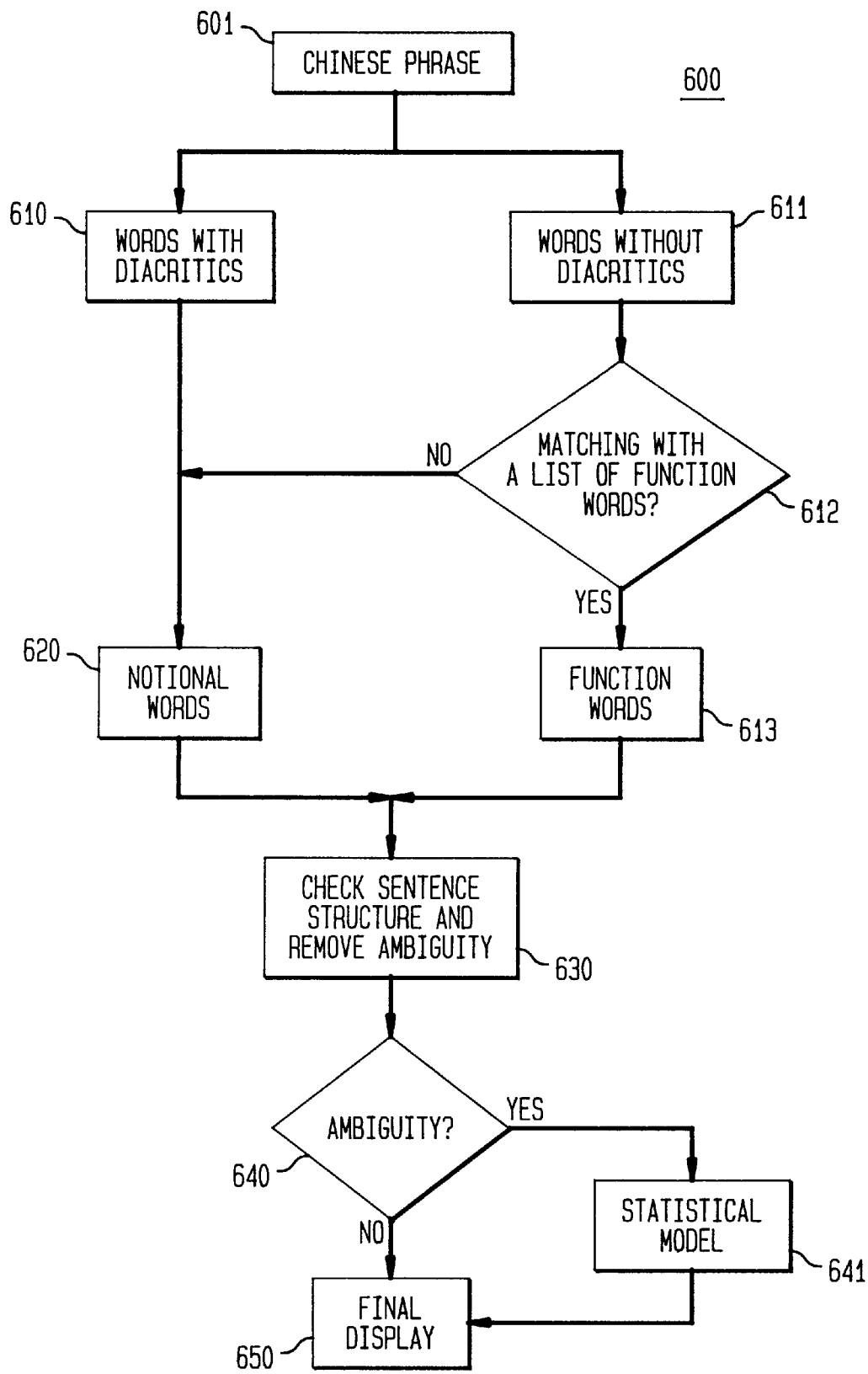
FIG. 6 is a flow chart showing a preferred syntactical method for processing Pinyin input with ambiguous word strings.

FIGS. 5 and 6 are flow charts of methods for processing the Pinyin text that is entered into the system 1000, e.g. by process 400. In one preferred embodiment, Pinyin text 1022 is entered by key strokes on the keyboard 1030 of the system and displayed, as discussed above, on the Pinyin portion 1021 of the graphical interface 1020. Concurrently, the Pinyin input in word form, stored above in step 414 is converted by process 500 into Hanzi form and displayed 1025 in the Hanzi portion 1024 of the graphical interface 1020. Therefore, the user entering Pinyin text and diacritics through the keyboard 1030 sees the Pinyin text 1022 (with the diacritic placed over the proper vowel by process 400) on the Pinyin portion 1021 of the graphical interface 1020 and the correct Hanzi translation 1025 of the entered Pinyin displayed on the Hanzi portion 1024 of the graphical interface by process 500. In alternative embodiments, Pinyin text with diacritics can be entered into the system 1000 by means other than the keyboard 1030, e.g., over a network 1090, audio system 1033, or with a magnetic medium 1032 like diskette.

Process 500 translates the Pinyin input into Hanzi. The system 1000 can process Pinyin and Hanzi in other ways. For example, the Pinyin 1022 text and/or the Hanzi text 1025 can be printed. Alternatively, the Pinyin 1022 and/or Hanzi 1025 text can be entered into known language translators 1034 and translated into other languages like English.

Processes 500 and 600 takes full advantage of the word boundary and the diacritics coding (marks) on the accented syllables. The two processes together handle a large variety of different styles of Pinyin writing theories and habits, and achieve high conversion accuracy. For example, if the Chinese words are delimited at well established boundaries, the word input 501 will be recognized as a unique word 511. If the word, is not and/or can not be delimited from other "words," a morphology unit being the process 500 executing on system 1000, morphologically analyzes and/or decomposes the word string. The invention is therefore able to determine the constituent "words" in the word string. This is done using the vocabulary 950 and the "longest string matching" algorithm described above.

The invention is also able to accurately processes Pinyin into Hanzi for either of the following conventions: 1. affixes included as part of the word or 2. affixes as a particles separate from the word. In one preferred embodiment, the second type of affix (particle) is treated as a function word. For convention 1, process 500 performs a morphological analysis, i.e., standard affixes included in unrecognized words (convention 1) are removed and the remaining word string (root) is analyzed without the affix. In later processing the removed affix is treated as a function word.

Process 500 uses morphology to process word string input. Morphology is the study of word formation in a language. Here the formation of words specifically involves affixes and how the meaning of words is affected by affixes. In the orthography of most European languages, such as English, German, Spanish, Finnish, and Hungarian, word meanings change depending on how affixes are used. For example, in the English expression "Calvin and Dorothy's Department Store", the "s" belongs to "Calvin and Dorothy", but is appended only after "Dorothy".

Process 500 first analyzes the morphology of entered words or word strings, e.g., from step 414. The algorithm starts with comparing 510 the entered word (string) 501 to a known vocabulary 950. The vocabulary 950 is a table of phonetic Chinese words and/or abbreviations (Pinyin and/or BPMF) with their associated Hanzi translation. A dictionary 950 of Chinese words can also be used. Such dictionaries 950 are well known. For example, see "Hanyu Pinyin Cihui" by the language publishing house "Yuwen Chubanshe," 1989. Dictionaries such as this can be improved by combining other known dictionaries and/or adding Chinese words with their Hanzi translations from other sources.

If the word input 501 (word or word string) matches one or more words in the vocabulary 510, its uniqueness is checked, 511. If there is no ambiguity, i.e., there is only a single match in the vocabulary 510, the word is converted to Hanzi form and displayed 550 in the Hanzi portion 1024. If it is ambiguous (that is, there are more than one Hanzi forms in the vocabulary (510, 950) corresponding to the phonetics of the word input 501), the different words are stored for further consideration (step 540).

If the word input 501 is not in the vocabulary, a morphological analysis is performed on the word input (string) 501. Part of the word input is compared with the list of function morphines, or affixes, step 522. A preferred list of affixes 800 is provided in FIG. 8. If a standard affix is found, i.e., it is on the affix list 800, the found affix is cut off 524 and the remaining part of the word input (root) is compared 510 with the dictionary 950 again. If the root of the root is in the vocabulary, step 511 is applied. If the root is not in the vocabulary 510 but there are more affixes in the root 522, step 524 is repeated for any other standard affixes remaining in the root.

If no standard affixes are recognized 522, i.e. no string in the word input 501 is in the affix list 800, the word string/root is decomposed 530. In one preferred embodiment, the root is decomposed using the "longest match method" above by comparing the root to the vocabulary 950.

If the word string is composed of more than one constituent, the uniqueness 531 of each constituent is searched. If a constituent is unique 531, the word is considered as a compound word and the corresponding string of Hanzi is displayed and recorded 550. If the word is ambiguous 531, e.g. one or more of the constituents of the word input 501 have more than one Hanzi translation and/or there are more than one ways to decompose the word string, these different alternatives are stored for further consideration, step 540.

In step 540, the whole phrase (or clause, or sentence), i.e., word string input 501, is determined as that string of characters that is delimited by phrase delimiters such as punctuations, carriage return, or any other phrase delimiters assigned by the user. The whole phrase is analyzed to determine the meaning of the ambiguous word(s). See process 600 of FIG. 6 below. After step 540, the entire sentence (phrase, clause) in Hanzi form is displayed, step 550. If there is any error, step 560, in the text displayed 560 on the graphical interface 1024, the user corrects the phrase, sentence or clause manually, 561.

To support the explanation of the syntactical analysis used by present invention given below (process 600), a discussion of a discovery of phonetic characteristics of acoustics of speech (tone and accents), function words, particles, affixes, and notional words is now presented.

There is an important phonetic phenomenon in spoken Chinese often overlooked. In Chinese, as in all spoken languages on the world, there is a great deal of information provided by the acoustics of speech in addition to the information provided by the mere string of individual syllables. In Chinese, each word has an accent structure that results in a speech acoustic for the word that is often crucial in understanding the word meaning. How syllables are grouped to form a word can affect the accent structure, speech acoustic, and understanding of the word.

Again, the separation of words (syllable grouping) and the commensurate accent structure of words (speech acoustic) are part of the information conveyed in the spoken language. For the Chinese language, tone, a part of the speech acoustic, is important as well. In Chinese, tone of a syllable is prominent only in accented syllables. For syllables that have no accent, the tone is either substantially weakened or completely lost.

Further note that in most languages, including Chinese, there are function words and notional words. Notional words include all nouns, all verbs, all adjectives, and most adverbs in a language. For example, "man, run, fast, and quickly" are notional words. Function words include articles, prepositions, and some conjunctions. For example, "a, the, to, from, and, but etc.," are function words. Affixes denoted as separate particles have characteristics of function words.

Function words in Chinese are unstressed words that express primarily a grammatical relationship and/or functions of other words rather than expressing a lexical meaning. Function words include prepositions, auxiliary verbs, conjunctions, adverbs, interjections, articles, and certain pronouns. In Chinese, the function words (articles, prepositions, postpositions, etc.), affixes in the form of a particle, and any affix in a multiple syllable word are always NOT accented. Function words (and affixes in particle form and affixes in a multiple syllable word) have no tone or a substantially weakened tone.

Notional words are words that have a full lexical meaning. In Chinese, notional words include all nouns, all main verbs, all adjectives, and most adverbs. Notional words include all words in Chinese that are not function words. The accent structure of notional words depends on the dialect.

Until now, it has not been recognized how a person listening to a language intuitively identifies notional words and function words in order to understand the words of the language. This is particularly true in the Chinese language. Since the tone of function words and affixes is very weak or completely missing in Chinese and because there are a limited number of known and identified function words in the Chinese language, function words are intuitively used by people listening to spoken Chinese to understand what is being said.

To further amplify the importance of function words, notional words, and tone in understanding the Chinese language, the accent structure of notional words and the use of function words (and affixes) is now examined.

The Shanghai dialect represents the clearest example of the accent structure of notional words and function word use. Every notional word starts with an accented syllable, which has a prominent tone. All other syllables in the word have no accents at all, therefore the tones of the syllables that follow the first syllable are muted. For example, in Shanghainese, the nouns "wenti" (question) and "dianhua" (telephone) are always accented at the first syllable.

The function words in the Shanghai dialect have no accent. When a function word follows a notional word, the function word sometimes can be interpreted as a suffix (i.e., an affix) of that notional word rather than a particle. However, part of the discovery is that from the point of view of human listener, these two interpretations (a function word being a particle or as a suffix) have no difference in substance.

In the Beijing and Mandarin dialects the accent structure is slightly different.

In most cases of the Beijing dialect, the accent of a notional word is at the first syllable. However, there are many cases where the accent is located at the last syllable instead of the first one.

Mandarin is the standard Chinese language. In Mandarin, the accent of a word is usually at the first syllable. In some words with more than 3 syllables, a "framed" accent structure is observed. That is, the first and the last syllables are accented, whereas all other syllables in between have no accent and have very weak (or no) tone. A multiple syllable notional word in Mandarin has at least one accent, usually at the first syllable. For example, in the syllable string "taiqilai", only the first syllable "tai" (lift) has an accent. For the remaining two syllables, not only is the acoustic energy much reduced, but also the tones are substantially weakened or completely lost. In the phrase "taibuqi tou lai", only the two syllables "tai" and "tou" have accents. The remaining syllables "ba", "qi", and "lai" are weak, and are atonic or almost atonic. (Atonic means without tone.) Note that "lai" is an afix that has no tone and, in this convention, is written as a separate particle.

In both the Beijing and Mandarin dialects, the function words, as a rule, have no accent and the tones of the function words are weak or missing (degenerate).

The discovery is that listeners to the spoken Chinese language intuitively use the accent structure of notional words (syllables with tone and syllables without tone) and untoned function words (and affixes) to demark word boundaries, classify words, and determine the meaning of words. This natural phonetic phenomenon is independent of the differing views of linguistic philosophy of the Chinese language and/or how one writes words or phrases in Chinese. The present invention develops and applies rules based on this phenomenon, and implements these rules with appropriate processes, to improve the accuracy of the processing (entering, analyzing, translating, and writing) phonetic Chinese.

Having completed the discussion of the discovery of phonetic relationships that were until now unrecognized in the prior art, the following discussion explains how these relationships are used in the syntactical analysis done by process 600.

A novel syntactical analysis method is shown in FIG. 6 as process 600. The process analyzes an entire phrase (or clause, or sentence) using principles discovered and disclosed above.

A word string (clause or a sentence) 501 is delimited with phrase delimiters like punctuations, a carriage return, or any input assigned by the user. In a preferred embodiment, these delimiters, or phrase delimiters, include the space (key 2360), phrase mark (key 2336), Chinese period 2335, left quotation mark (key 2338), right quotation mark (key 2339), left title mark (key 2341), right title mark (key 2342), exclamation mark (key 2311), comma (key 2312), slash (key 2313), left parenthesis (key 2314), right parenthesis (on key 2315), colon (on key 2316), semicolon (key 2316), bullet (key 2344) and question mark (key 2317). A double stroke on any of the tone keys (2310, 2320, 2330, 2340, and 2350) can also be a phase delimiter. (The keys indicated in parenthesis here designate the key in this embodiment of the keyboard 2300 that enters the phrase delimiter.) These phrase delimiters unambiguously define a word boundary, i.e. the end of one phrase and the beginning of another phrase 501.

Phrases with one or more ambiguous words, as defined in steps 511 and 531, are input 601 to the process 600. A syntactical unit is process 600 being executed on the system 1000.

First, the word components of a phrase 601 are classified by the existence of any tone diacritics. The words with at least one diacritic 610 are notional words 620.

Words without diacritics 611, however, could be: notional words with the diacritic inadvertently omitted, non-Chinese words, function words, affixes or affixes written as independent particles. In mixed text entry, non-Chinese words are delimited by spaces (or another equivalent character, e.g. the "Esc") and therefore are recognized.

To determine if the words without diacritics 611 are function words, the words 611 are compared to a function word list 800. The number of function words is limited, under 100 according to most linguists. If the word 611 is on the function word list 800, it is a function word. The meaning of each function word is uniquely defined. A preferred function word list 800 is provided in FIG. 8.

In similar manner, the words without diacritics 611 can be compared to an affix list (also included in list 800) to determine whether they are affixes and/or affixes written as independent particles. The meaning of these independent particles is uniquely defined. One preferred list of particle/affixes is also relatively short, having under 20 entries. Particle affixes with their Hanzi translations are included on the list of function words in FIG. 8.

Data structure 800 that lists function words, particles, and affixes take relatively little space in the computer memory (1100, 1200.)

Once all the function (and/or particle affixes) words are identified, and therefore uniquely defined, the phrase/sentence structure is analyzed in step 630. Since the meanings and the function of the function words (particle/affixes) are known, the types of words preceding and following any particular function word (affix) are limited. Therefore, the ambiguity of any notional word can be further reduced or eliminated in step 640 by using the relationship of the ambiguous notional word with one or more function words (particle/affixes.) For instance, if there are five possible words identified in step 540 of process 500 for an ambiguous notional word, some or all but one of these possible words might be eliminated by knowing the function word (affix) preceding or following the ambiguous word.

For example, prepositions 810, considered function words, are listed in FIG. 8. These prepositions must be followed by a noun or a noun phrase. If any notional word following these prepositions has a translation that is not a noun or a noun phrase, this ambiguous translation is removed.

Tense particles 820 (le, zhe, guo) usually follow verbs. Therefore, any ambiguous notional word with these particles following is translated as a verb. If any of the alternative translations for this notional word are not a verb, they are deleted.

Relation particles 830 (de, zhi) usually follow nouns or adjectives. Therefore, any ambiguous notional word with these particles following is translated as a noun or adjective. Alternative ambiguous translations are deleted.

Conjunctions (he, ji, and gen) 840 are function words and usually go between nouns. Therefore, any ambiguous notional word on either side of these conjunctions 840 is translated as a noun. Alternative ambiguous translations are deleted.

Conjunctions 850 are function words that usually go between phrases. Notional words are either side of these conjunctions 850 are considered as part of a phrase.

Noun suffixes 860 are affixes that are usually are part of a noun. Notional words preceding these suffixes 860 are translated as nouns. Alternative ambiguous translations are deleted.

There are adjective and adverb suffixes 870 that must be preceded by an adjective or an adverb. Any notional words preceding these suffixes (particles) having a translation that is not an adjective or an adverb are removed.

There are also adjective and adverb prefixes that include hen-, zui-, bu-, and geng-. These particles/affixes must be followed by adjectives or adverbs. If any notional word following these prefixes (particles) has a translation that is not an adjective or an adverb, these ambiguous translations are removed.

There are rare exceptions to these rules which might result in an erroneous translation that would be corrected by hand.

Note that the list 800 does not include abbreviations of the function words, particles, and affixes. Abbreviations could be included in alternative embodiments.

If there is a remaining ambiguity in step 640, i.e. more than one possible notional word still exists, statistics of the relative word occurrence in the phrase are applied 641 to predict the most probable word of the remaining notional word candidates. Statistical models 641 like this are well known in the speech recognition arts. See for example, *Fundamentals of Speech Recognition* by Rabiner and Juang, 1993, pages 447–450 which is herein incorporated by reference.

In one preferred embodiment, the results are displayed 650 on the Hanzi 1024 portion of the graphical interface 1020. If there are words that can not be resolved unambiguously, the remaining candidates are presented to the user on the graphical interface 1020 for selection by a pointing device 1031. In addition, the displayed result 650, 1025 is subject to manual correction by the user 650. In alternative embodiments, the final display could be printed on a printer or transmitted over a network connection 1090. The displayed result 650 can also be Hanzi input to other computer systems, for example, a translator 1034 that translates the Hanzi text into another language.

By using processes 500 and 600, the system 1000 can determine the meanings and Hanzi translation of constituent words in the word input 501, even though the words were not separated according to any generally accepted convention or delimited at a boundary.

Given this disclosure one skilled in the art could develop alternative equivalent embodiments that are within the contemplation of the inventor. For example, a keyboard like the one in FIG. 2D can be designed to include the 37 characters in the BPMF phonetic alphabet. The key assignment for this phonetic alphabet depends on the choice of the user/manufacturer. ASCII code assignments for the 37 characters can be made in the upper 7 bit region of FIG. 3. Diacritics for BPMF can also be provided on the keyboard and in the ASCII code table. However, some modification may be necessary. For example, a diacritic for the high tone might be provided. The syllable table 700 and function word, particle, and affix table 800 for BPMF has a one to one correspondence to the Pinyin case. The processes shown is FIG. 4, 5, and 7 still apply.

I claim:

1. A method where a word string is processed by a morphology process comprising the steps of:

removing one or more affixes from the word string to create a root, the removed affix being one of the affixes on an affix list;

comparing the root to one or more of the words in a vocabulary to find a match, the vocabulary having a plurality of words, each with one or more Hanzi translations, the word in the vocabulary matching the root being the root match; and storing in the computer memory the Hanzi translation of the root match.

2. A method, as in claim 1, where one or more roots are unmatched roots, the unmatched roots having no match in the vocabulary, and the unmatched roots are decomposed into constituent words.

3. A computer system for processing Chinese language text comprising:

an input apparatus for entering a phonetic Chinese language phrase, the phrase having one or more words, each word having one or more syllables, each syllable having one or more characters, the phrase being a string of the characters between a first and second phrase delimiter;

an affix list having a plurality of entries being phonetic Chinese affixes;

a vocabulary of Chinese words, the vocabulary being a list of a plurality of phonetic Chinese words with a Hanzi translation; and a morphology unit that removes one or more affixes from the phrase to create a root, the removed affix being one of the affixes on the affix list, the morphology unit comparing the root to one or more of the words in the vocabulary to find a match, and storing in a computer memory the Hanzi translation of the word in the vocabulary that matches the root.

4. A system, as in claim 3, further comprising a syntactical unit, the syntactical unit parsing the root into accented words and unaccented words, the accented words being marked with diacritics and unaccented words being not marked with diacritics.

5. A system, as in claim 4, where the entries include affixes, function words, and particles, each entry having a Hanzi translation, the syntactical unit matching the unaccented words with one or more of the entries, the entry matching he unaccented word being a matched entry, and the syntactical unit using the Hanzi translation of the matched entry as a translation of unaccented word in the phrase.

6. A system, as in claim 5, where the syntactical unit further translates one or more of the accented words as an ambiguous notional word, the ambiguous notional word having an ambiguity because of there is more than one Hanzi translation of the ambiguous notional word in the vocabulary, and the syntactical unit removing the ambiguity by using a relationship of the ambiguous notional word with one or more of the unaccented words words in the phrase.

7. A system, as in claim 4, where the first and second phrase delimiters are any one of the following: a carriage return, a space, a phrase mark, a Chinese period, a left quotation mark, a right quotation mark, a left title mark, a right title mark, an exclamation mark, a comma, a slash, a left parenthesis, a right parenthesis, a colon, a semicolon, a bullet, a question mark, and two or more strokes of a tone key.

8. A system, as in claim 4, where the morphology unit decomposes the word into constituent words if the word does not match one of the words in the vocabulary and the syntactical unit parses the constituent words.

9. A method of syntactically analyzing a Chinese phrase of phonetic syllables comprising the steps of:

parsing the Chinese phrase into accented words with one or more syllables marked with a diacritic indicating a tone of the syllable and unaccented words having no syllables marked with a diacritic;

matching the the unaccented words with one or more of the entries, the entries being zero or more affixes, function words, and particles on an affix list, each entry having a Hanzi translation;

using the respective Hanzi translation to translate the unaccented word into Hanzi.

10. A method, as in claim 9, comprising the further step of:

translating one or more of the accented words as a notional word, zero or more of the notional words being an ambiguous notional word, the ambiguous notional word having more than one translation into Hanzi in a vocabulary.

11. A method, as in claim 10, where one or more of the translations is deleted because the deleted translation does not have a relationship with one of the unaccented words.

* * * * *